US012634081B2

(12) United States Patent
Hao et al.

(10) Patent No.: US 12,634,081 B2
(45) Date of Patent: May 19, 2026

(54) METHODS FOR CSI-RS RESOURCE AGGREGATION

(71) Applicant: QUALCOMM Incorporated, San Diego, CA (US)

(72) Inventors: Chenxi Hao, Beijing (CN); Yu Zhang, San Diego, CA (US); Liangming Wu, Beijing (CN); Wei Xi, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 18/245,853

(22) PCT Filed: Nov. 6, 2020

(86) PCT No.: PCT/CN2020/127268
§ 371 (c)(1),
(2) Date: Mar. 17, 2023

(87) PCT Pub. No.: WO2022/094972
PCT Pub. Date: May 12, 2022

(65) Prior Publication Data
US 2024/0048325 A1     Feb. 8, 2024

(51) Int. Cl.
*H04L 5/00* (2006.01)
*H04W 24/08* (2009.01)

(52) U.S. Cl.
CPC ........... *H04L 5/0051* (2013.01); *H04W 24/08* (2013.01)

(58) Field of Classification Search
CPC ..... H04L 5/0051; H04L 5/0094; H04L 5/005; H04W 24/08
See application file for complete search history.

(56) References Cited

U.S. PATENT DOCUMENTS 9,999,074 B2 * 6/2018 Moon ...................... H04B 7/06
2016/0094326 A1 * 3/2016 Moon ...................... H04L 5/14
370/330

(Continued)

FOREIGN PATENT DOCUMENTS

CN      106664192 A      5/2017
CN      109417462 A      3/2019

(Continued)

OTHER PUBLICATIONS

CN_112491524_B—English Translation of original Document (Year: 2024).*

(Continued)

*Primary Examiner* — Kevin T Bates

*Assistant Examiner* — Poonam Sharma

(74) *Attorney, Agent, or Firm* — QUALCOMM Incorporated

(57) ABSTRACT

Certain aspects of the present application relate to techniques for configuring and/or performing channel state information-reference signal (CSI-RS) resource aggregation. For example, the techniques described herein enable multiple resource mappings within a single CSI-RS resource. These multiple mappings may facilitate the aggregation of a greater number of CSI-RS resources, thereby supporting a larger number of CSI-RS ports. A user equipment (UE) may then perform CSI measurements using this expanded set of CSI-RS ports.

30 Claims, 24 Drawing Sheets

(56)  References Cited

U.S. PATENT DOCUMENTS

| 2016/0248562 | A1* | 8/2016 | Nam | ............... | H04L 5/0051 |
| 2016/0301511 | A1* | 10/2016 | Yoon | ............... | H04B 7/0413 |
| 2019/0191444 | A1 | 6/2019 | Park et al. | | |
| 2020/0366437 | A1* | 11/2020 | Jiang | ............... | H04L 5/0053 |
| 2020/0389219 | A1* | 12/2020 | Muruganathan | ........ | H04L 5/005 |

FOREIGN PATENT DOCUMENTS

| CN | 110574328 | A | | 12/2019 | | |
| CN | 111478761 | A | | 7/2020 | | |
| CN | 112491524 | B | * | 2/2024 | ........... | H04L 5/0048 |
| EP | 4210378 | A1 | * | 7/2023 | ............ | H04W 24/08 |

OTHER PUBLICATIONS

International Search Report and Written Opinion—PCT/CN2020/127268—ISA/EPO—Aug. 5, 2021.

Moderartor: "Summary on [102-e-NR-TEI-02]", 3GPP TSG RAN WG1 #102-e, R1-200xxxx, Aug. 28, 2020 (Aug. 28, 2020), e-Meeting, Aug. 17-28, 2020, 5 Pages, the whole document.

* cited by examiner

- $b_i$: spatial domain basis
- $f_m^H$: frequency domain basis
- $c_{i,m}$: linear combination coefficients

① SRS

② Precoded CSI-RS via $b_i$ and $f_m^H$ based on spatial and delay reciprocity

③ CSI reporting ($c_{i,m}$)

1000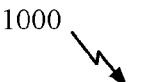

┌─────────────────────────────────────────────────────────────┐ ⌐ 1002
│  RECEIVING INFORMATION REGARDING A CONFIGURATION OF AT        │
│  LEAST ONE CHANNEL STATE INFORMATION (CSI) REFERENCE          │
│  SIGNAL (RS) RESOURCE, WHEREIN THE CONFIGURATION OF EACH      │
│  CSI-RS RESOURCE COMPRISES ONE OR MORE RESOURCE MAPPING       │
│  CONFIGURATIONS                                               │
└─────────────────────────────────────────────────────────────┘

┌─────────────────────────────────────────────────────────────┐ ⌐ 1004
│  DETERMINING, FROM THE INFORMATION, RESOURCES FOR A FIRST     │
│  SET OF CSI-RS PORTS OR CODE DIVISION MULTIPLEXING (CDM)      │
│  GROUPS WITHIN THE CSI-RS RESOURCE BASED AT LEAST IN PART ON  │
│  A FIRST RESOURCE MAPPING, AND RESOURCES FOR A SECOND SET     │
│  OF CSI-RS PORTS OR CDM GROUPS WITHIN THE RESOURCE BASED AT   │
│  LEAST IN PART ON A SECOND RESOURCE MAPPING                   │
└─────────────────────────────────────────────────────────────┘

┌─────────────────────────────────────────────────────────────┐ ⌐ 1006
│  PERFORMING CSI MEASUREMENT USING THE FIRST AND SECOND        │
│  SETS OF CSI-RS PORTS ACROSS THE PLURALITY OF RESOURCE        │
│  CONFIGURATIONS                                               │
└─────────────────────────────────────────────────────────────┘

1102

TRANSMITTING, TO A USER EQUIPMENT (UE), INFORMATION REGARDING A CONFIGURATION OF AT LEAST ONE CHANNEL STATE INFORMATION (CSI) REFERENCE SIGNAL (RS) RESOURCE, WHEREIN THE CONFIGURATION OF EACH CSI-RS RESOURCE COMPRISES ONE OR MORE RESOURCE MAPPING CONFIGURATIONS

1104

TRANSMITTING CSI-RS, IN ACCORDANCE WITH THE INFORMATION, ON RESOURCES FOR A FIRST SET OF CSI-RS PORTS OR CODE DIVISION MULTIPLEXING (CDM) GROUPS WITHIN THE CSI-RS RESOURCE BASED AT LEAST IN PART ON A FIRST RESOURCE MAPPING, AND ON RESOURCES FOR A SECOND SET OF CSI-RS PORTS OR CDM GROUPS WITHIN THE RESOURCE BASED AT LEAST IN PART ON A SECOND RESOURCE MAPPING

1106

RECEIVING, FROM THE UE, A REPORT BASED ON CSI MEASUREMENT USING THE FIRST AND SECOND SETS OF CSI-RS PORTS ACROSS THE PLURALITY OF RESOURCE CONFIGURATIONS

FIG. 11

```
NZP-CSI-RS-Resource ::=                  SEQUENCE {
nzp-CSI-RS-ResourceId                        NZP-CSI-RS-ResourceId,
resourceMapping                              CSI-RS-ResourceMapping,
[resourceMappingList-r17                     SEQUENCE (SIZE(1..4)) OF CSI-RS-ResourceMapping] or
[AdditionalResourceMappingList-r17           SEQUENCE (SIZE(1..3)) OF CSI-RS-ResourceMapping]
powerControlOffset                           INTEGER (-8..15),
powerControlOffsetSS                         ENUMERATED{db-3, db0, db3, db6}        OPTIONAL,    -- Need R
scramblingID                                 ScramblingId,
periodicityAndOffset                         CSI-ResourcePeriodicityAndOffset      OPTIONAL,    -- Cond PeriodicOrSemiPersistent
qcl-InfoPeriodicCSI-RS                       TCI-StateId                           OPTIONAL,    -- Cond Periodic
...
}

CSI-RS-ResourceMapping ::=               SEQUENCE {
frequencyDomainAllocation                    CHOICE {
    row1                                         BIT STRING (SIZE (4)),
    row2                                         BIT STRING (SIZE (12)),
    row4                                         BIT STRING (SIZE (3)),
    other                                        BIT STRING (SIZE (6))
},
nrofPorts                                    ENUMERATED {p1,p2,p4,p8,p12,p16,p24,p32},
firstOFDMSymbolInTimeDomain                  INTEGER (0..13),
firstOFDMSymbolInTimeDomain2                 INTEGER (2..12)
cdm-Type                                     ENUMERATED {noCDM, fd-CDM2, cdm4-FD2-TD2, cdm8-FD2-TD4},
density                                      CHOICE {
    dot5                                         ENUMERATED {evenPRBs, oddPRBs},
    one                                          NULL,
    three                                        NULL,
    spare                                        NULL
},
freqBand                                     CSI-FrequencyOccupation,
...
}
```

FIG. 12

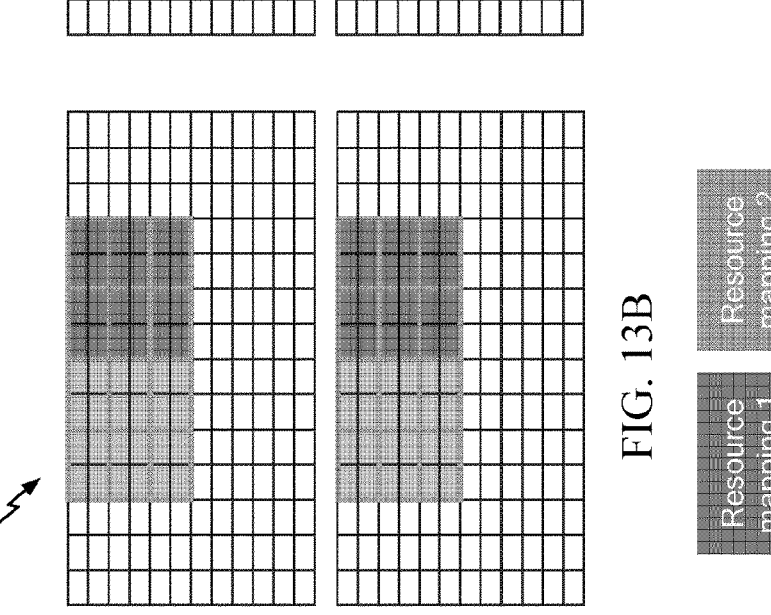
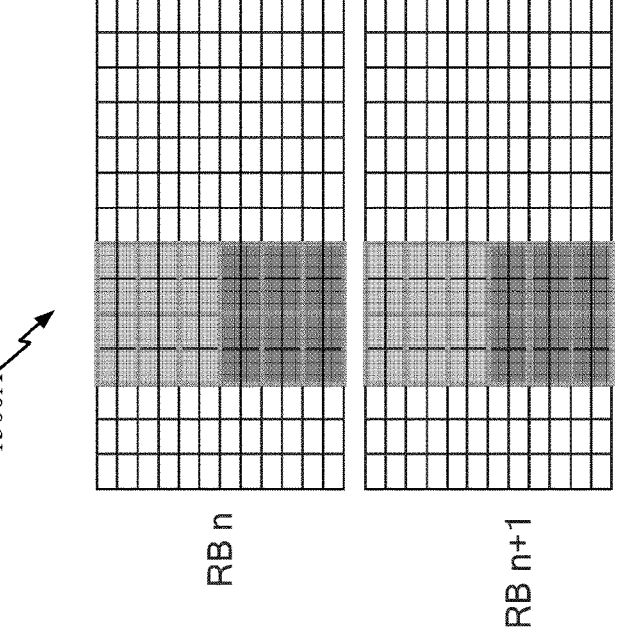
RB n
RB n+1
FIG. 13A
FIG. 13B
FIG. 13C

```
NZP-CSI-RS-Resource ::=          SEQUENCE {
    nzp-CSI-RS-ResourceId            NZP-CSI-RS-ResourceId,
    resourceMapping                  CSI-RS-ResourceMapping,
    ...
}

CSI-RS-ResourceMapping ::=        SEQUENCE {
    frequencyDomainAllocation        CHOICE {
        row1                             BIT STRING (SIZE (4)),
        row2                             BIT STRING (SIZE (12)),
        row4                             BIT STRING (SIZE (3)),
        other                            BIT STRING (SIZE (6))
    },
    [[frequencyDomainAllocation2     CHOICE {
        row1                             BIT STRING (SIZE (4)),
        row2                             BIT STRING (SIZE (12)),
        row4                             BIT STRING (SIZE (3)),
        other                            BIT STRING (SIZE (6))
    }]]
    nrofPorts                        ENUMERATED {p1,p2,p4,p8,p12,p16,p24,p32},
    firstOFDMSymbolInTimeDomain      INTEGER (0..13),
    firstOFDMSymbolInTimeDomain2     INTEGER (2..12)
    firstOFDMSymbolInTimeDomain3     INTEGER (4..12),
    firstOFDMSymbolInTimeDomain4     INTEGER (6..12)
    cdm-Type                         ENUMERATED {noCDM, fd-CDM2, cdm4-FD2-TD2, cdm8-FD2-TD4},
    density                          CHOICE {
        dot5                             ENUMERATED {evenPRBs, oddPRBs},
        one                              NULL,
        three                            NULL,
        spare                            NULL
    },
    [[density2                       CHOICE {
        dot5                             ENUMERATED {evenPRBs, oddPRBs},
        one                              NULL,
        three                            NULL,
        spare                            NULL
    }]]
    freqBand                         CSI-FrequencyOccupation,
    ...
}
```

OPTIONAL,  -- Need R

OPTIONAL,  -- Need R

FIG. 15

Fd-CDM2   CDM4-FD2-TD2   CDM8-FD2-TD4

FD-CDM2 (red box)

RE location 1
RE location 2
RE location 3
RE location 4
RE location 5
RE location 6

Symbol location 1     Symbol location 2 >= symbol location 1 + 2

CDM8-FD2-TD4 (red box)

RE location 1
RE location 2
RE location 3
RE location 4
RE location 5
RE location 6

Symbol location 1

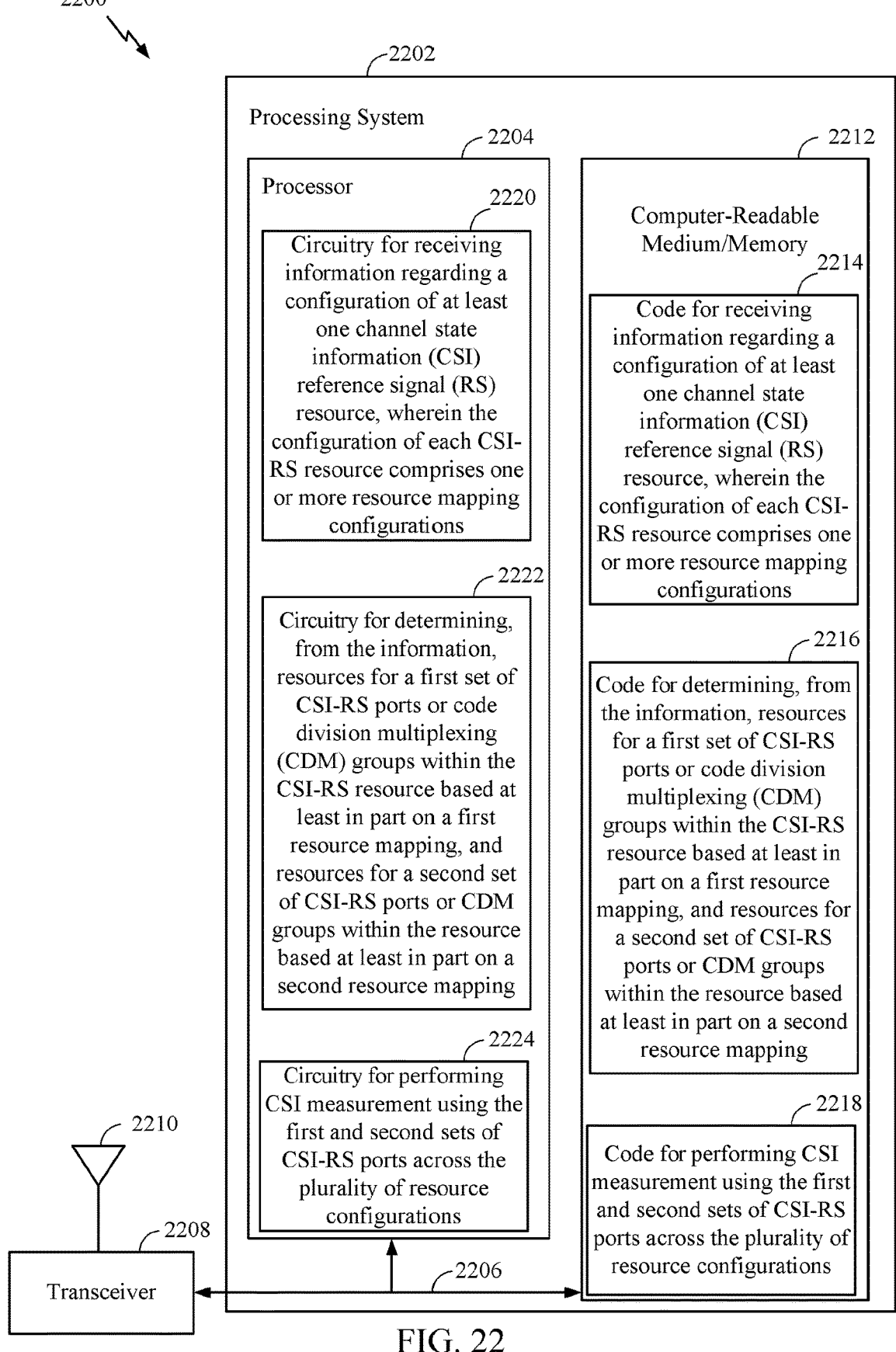

2200

2202

Processing System

2204

Processor

2220

Circuitry for receiving information regarding a configuration of at least one channel state information (CSI) reference signal (RS) resource, wherein the configuration of each CSI-RS resource comprises one or more resource mapping configurations

2222

Circuitry for determining, from the information, resources for a first set of CSI-RS ports or code division multiplexing (CDM) groups within the CSI-RS resource based at least in part on a first resource mapping, and resources for a second set of CSI-RS ports or CDM groups within the resource based at least in part on a second resource mapping

2224

Circuitry for performing CSI measurement using the first and second sets of CSI-RS ports across the plurality of resource configurations

2212

Computer-Readable Medium/Memory

2214

Code for receiving information regarding a configuration of at least one channel state information (CSI) reference signal (RS) resource, wherein the configuration of each CSI-RS resource comprises one or more resource mapping configurations

2216

Code for determining, from the information, resources for a first set of CSI-RS ports or code division multiplexing (CDM) groups within the CSI-RS resource based at least in part on a first resource mapping, and resources for a second set of CSI-RS ports or CDM groups within the resource based at least in part on a second resource mapping

2218

Code for performing CSI measurement using the first and second sets of CSI-RS ports across the plurality of resource configurations

2210

2208

Transceiver

METHODS FOR CSI-RS RESOURCE AGGREGATION

CROSS-REFERENCE TO RELATED APPLICATION(S)

This Application is a national stage application under 35 U.S.C. 371 of PCT/CN2020/127268, filed Nov. 6, 2020, the entire contents of which are incorporated herein by reference.

BACKGROUND

Field of the Disclosure

Aspects of the present disclosure relate to wireless communications, and more particularly, to techniques for channel state information (CSI) reference signal (RS) resource aggregation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes receiving information regarding a configuration of at least one channel state information (CSI) reference signal (RS) resource, wherein the configuration of each CSI-RS resource comprises one or more resource mapping configurations, determining, from the information, resources for a first set of CSI-RS ports or code division multiplexing (CDM) groups within the CSI-RS resource based at least in part on a first resource mapping, and resources for a second set of CSI-RS ports or CDM groups within the resource based at least in part on a second resource mapping, and performing CSI measurement using the first and second sets of CSI-RS ports across the plurality of resource configurations.

Certain aspects of the disclosure relate to a method for wireless communication by a network entity. The method generally includes transmitting, to a UE, information regarding a configuration of at least one CSI-RS resource, wherein the configuration of each CSI-RS resource comprises one or more resource mapping configurations, transmitting CSI-RS, in accordance with the information, on resources for a first set of CSI-RS ports or CDM groups within the CSI-RS resource based at least in part on a first resource mapping, and on resources for a second set of CSI-RS ports or CDM groups within the resource based at least in part on a second resource mapping, and receiving, from the UE, a report based on CSI measurement using the first and second sets of CSI-RS ports across the plurality of resource configurations.

Aspects of the present disclosure also provide various apparatuses, means, and computer readable including instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 10 illustrates example operations for wireless communication by a UE, in accordance with certain aspects of the present disclosure.

FIG. 11 illustrates example operations for wireless communication by a network entity, in accordance with certain aspects of the present disclosure.

FIGS. 12 and 15 illustrate example code configured to execute one or more techniques described herein, in accordance with certain aspects of the present disclosure.

FIGS. 13, 14, and 16-21 illustrate examples of CSI-RS resource aggregation, in accordance with certain aspects of the present disclosure.

FIG. 22 illustrates a device with example components capable of performing various operations in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
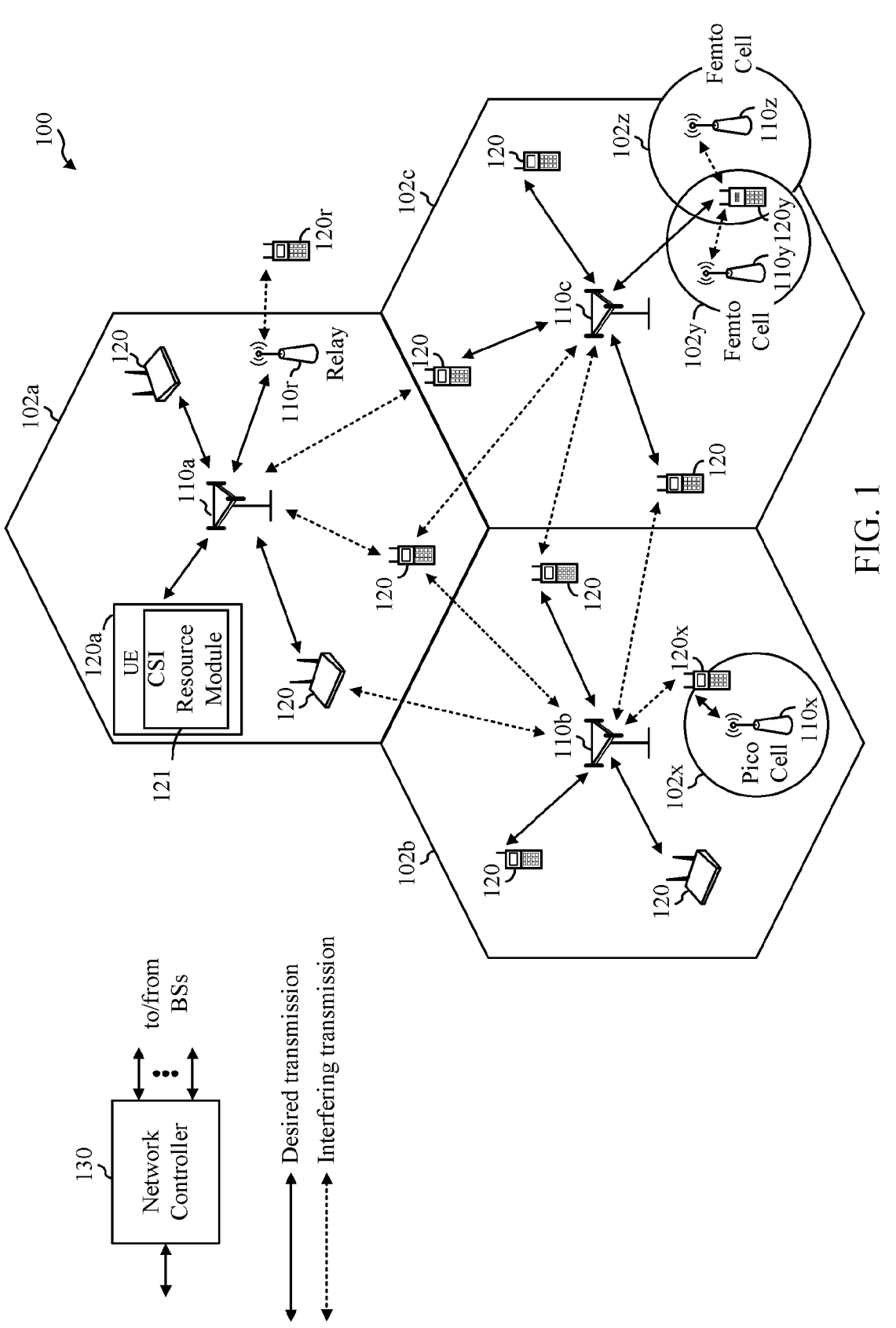
FIG. 1 is a block diagram conceptually illustrating an example telecommunications system, in accordance with certain aspects of the present disclosure.

Aspects of the present disclosure relate to wireless communications, and more particularly, to techniques for efficiently configuring and/or performing channel state information (CSI) reference signal (RS) resource aggregation.

While conventional systems may only support a single resource mapping configuration in each CSI-RS resource configured for a UE, aspects of the present disclosure provide for multiple resource mappings in a resource. The multiple resource mappings may lead to greater flexibility and help in aggregating a larger number of resources (e.g., supporting a larger number of ports than supported in conventional systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include a CSI resource module 121 configured to perform operations 1000 described below with reference to FIG. 10. Similarly, a base station 110 (e.g., a gNB) may be configured to perform operations 1100 described below with reference to FIG. 11 (e.g., to configure a UE 120 performing operations 1000 of FIG. 10).

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.8 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a LE and a BS.

Figure 2:
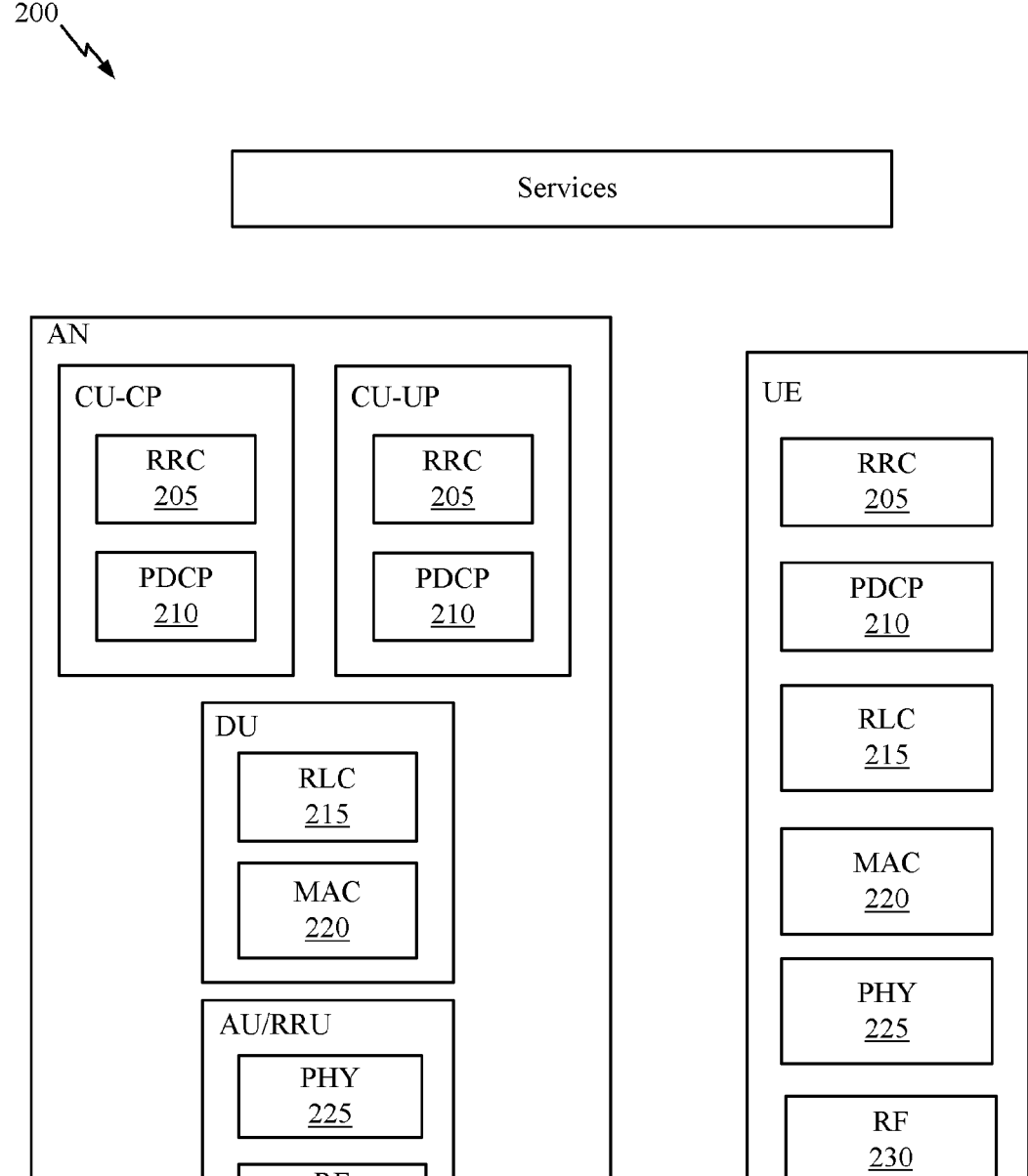
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the access network (AN) (e.g., BS 110 in FIG. 1). The radio resource control (RRC) layer 205, packet data convergence protocol (PDCP) layer 210, radio link control (RLC) layer 215, medium access control (MAC) layer 220, physical (PHY) layer 225, and radio frequency (RF) layer 230 may be implemented by the AN. For example, the central unit-control plane (CU-CP) may implement the RRC layer 205 and the PDCP layer 210. A distributed unit (DU) may implement the RLC layer 215 and MAC layer 220. The antenna unit/remote radio unit (AU/RRU) may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
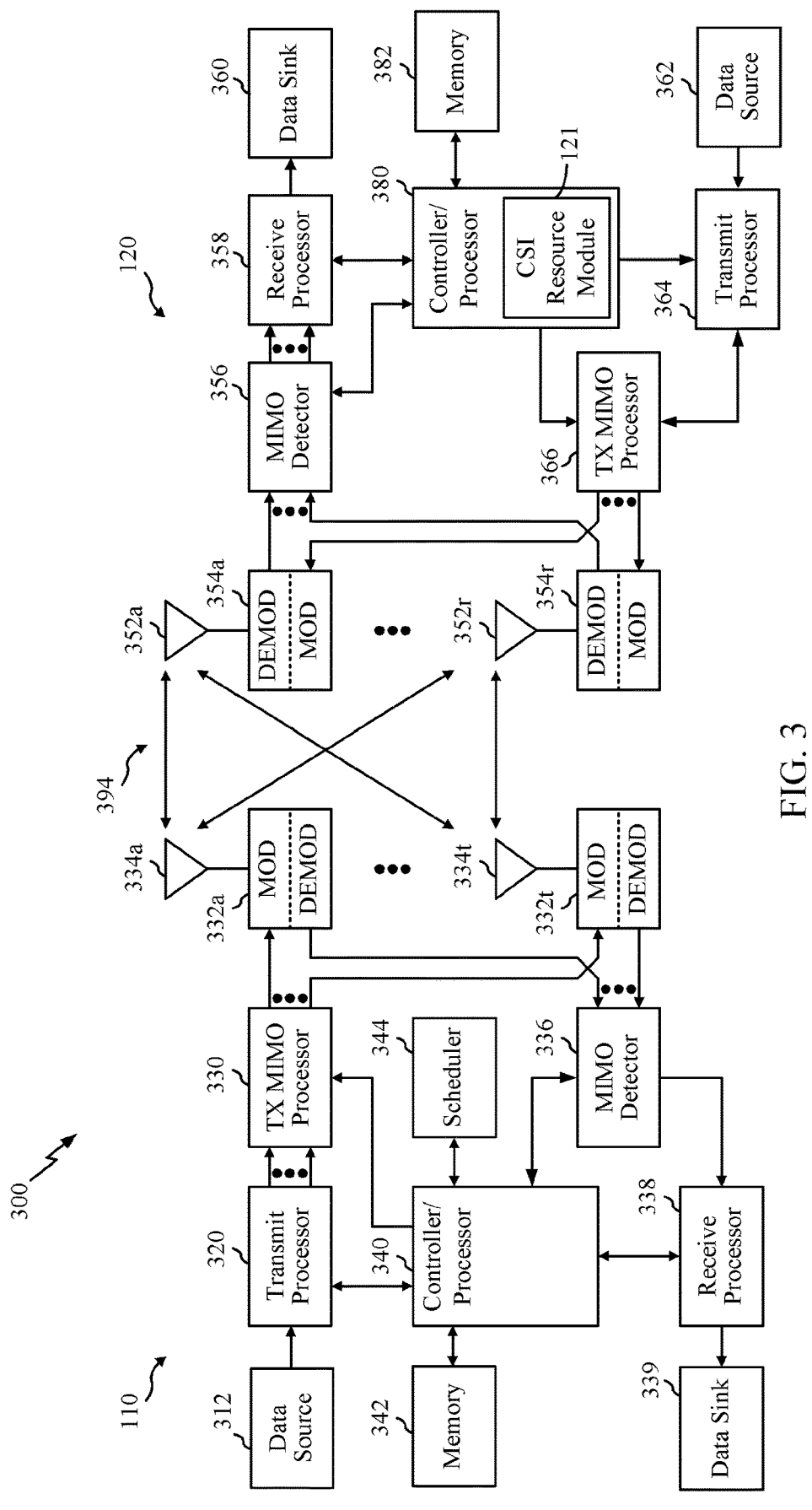
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 may include a CSI resource module 121 configured (or used) to perform operations 1000 described below with reference to FIG. 10. Similarly, antennas 334, processors 320, 330, 338, and/or controller/processor 340 of the BS 110 may be configured (or used) to perform operations 1100 described below with reference to FIG. 11.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354 a through 354 r, and a receiver (e.g., UE 110) includes multiple receive antennas 352 a through 352 r. Thus, there are a plurality of signal paths 394 from the transmit antennas 354 a through 354 r to the receive antennas 352 a through 352 r. Each of the transmitter and the receiver may be implemented, for example, within a UE 120, a BS 110, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

Figure 4:
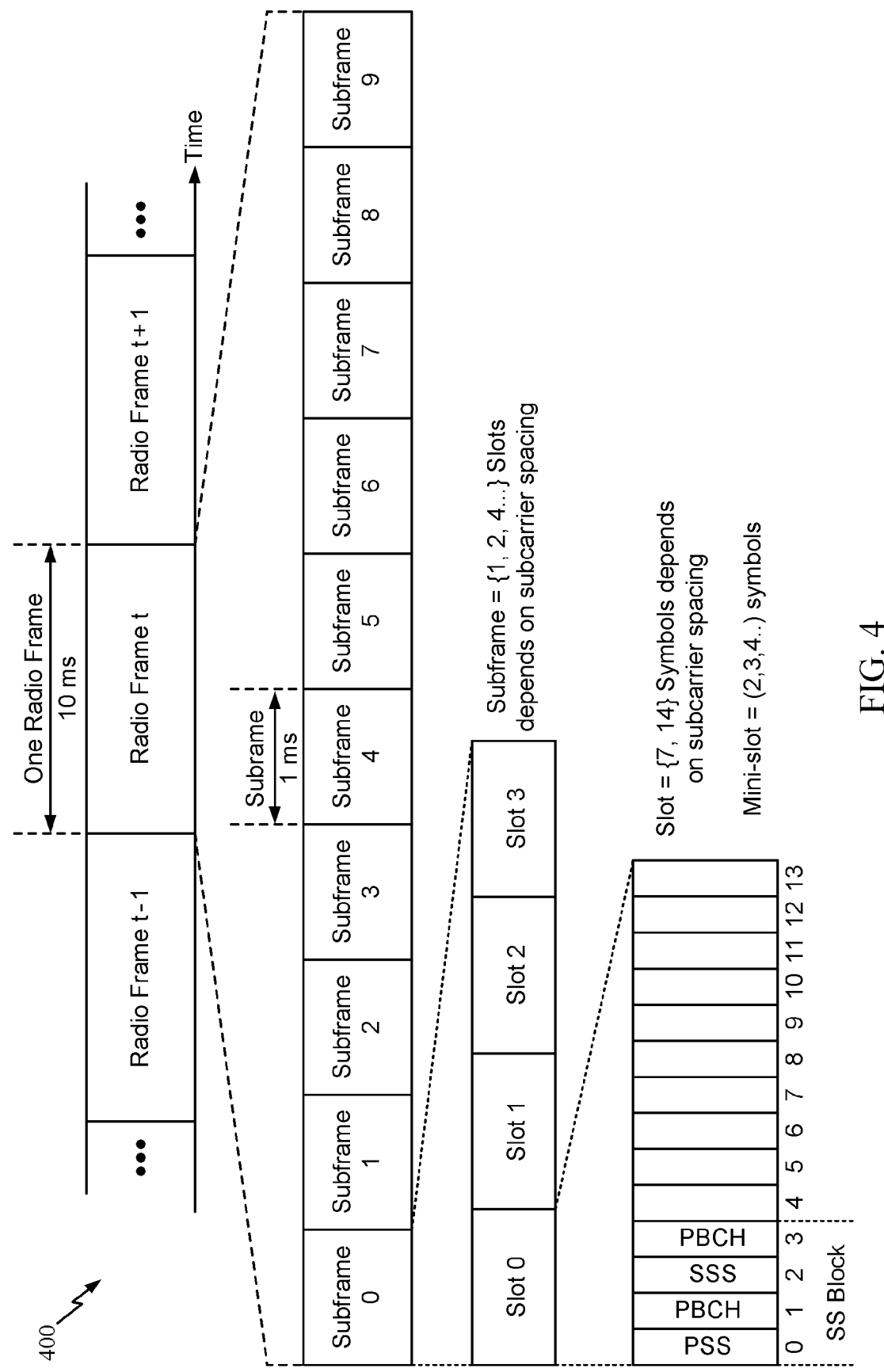
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically measured at the receiver, quantized, and fed back to the transmitter.

The time and frequency resources that can be used by the UE to report CSI are controlled by a base station (e.g., gNB). CSI may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

The base station may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-Semi-PersistentOnPUSCH-TriggerStateList). The CSI report trigger for aperiodic CSI and semi-persistent CSI on PUSCH may be provided via downlink control information (DCI).

The UE may report the CSI feedback based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $$N_{PRB}^{SB}$$

contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Compressed CSI Feedback Coefficient Reporting

As discussed above, a user equipment (UE) may be configured for channel state information (CSI) reporting, for example, by receiving a CSI configuration message from the base station. In certain systems (e.g., 3GPP Release 15 5G NR), the UE may be configured to report at least a Type II precoder across configured frequency domain (FD) units. For example, the precoder matrix $W_r$ for layer r includes the $W_1$ matrix, reporting a subset of selected beams using spatial compression and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = [\underbrace{c_{i,0} \; \dots \; c_{i,N_3-1}}_{N_3}],$$

where $b_i$ is the selected beam, $c_i$ is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is RRC configured. The precoder is based on a linear combination of DFT beams. The Type II codebook may improve MU-MIMO performance. In some configurations considering there are two polarizations, the $W_{2,r}$ matrix has size $2L \times N_3$.

Figure 5:
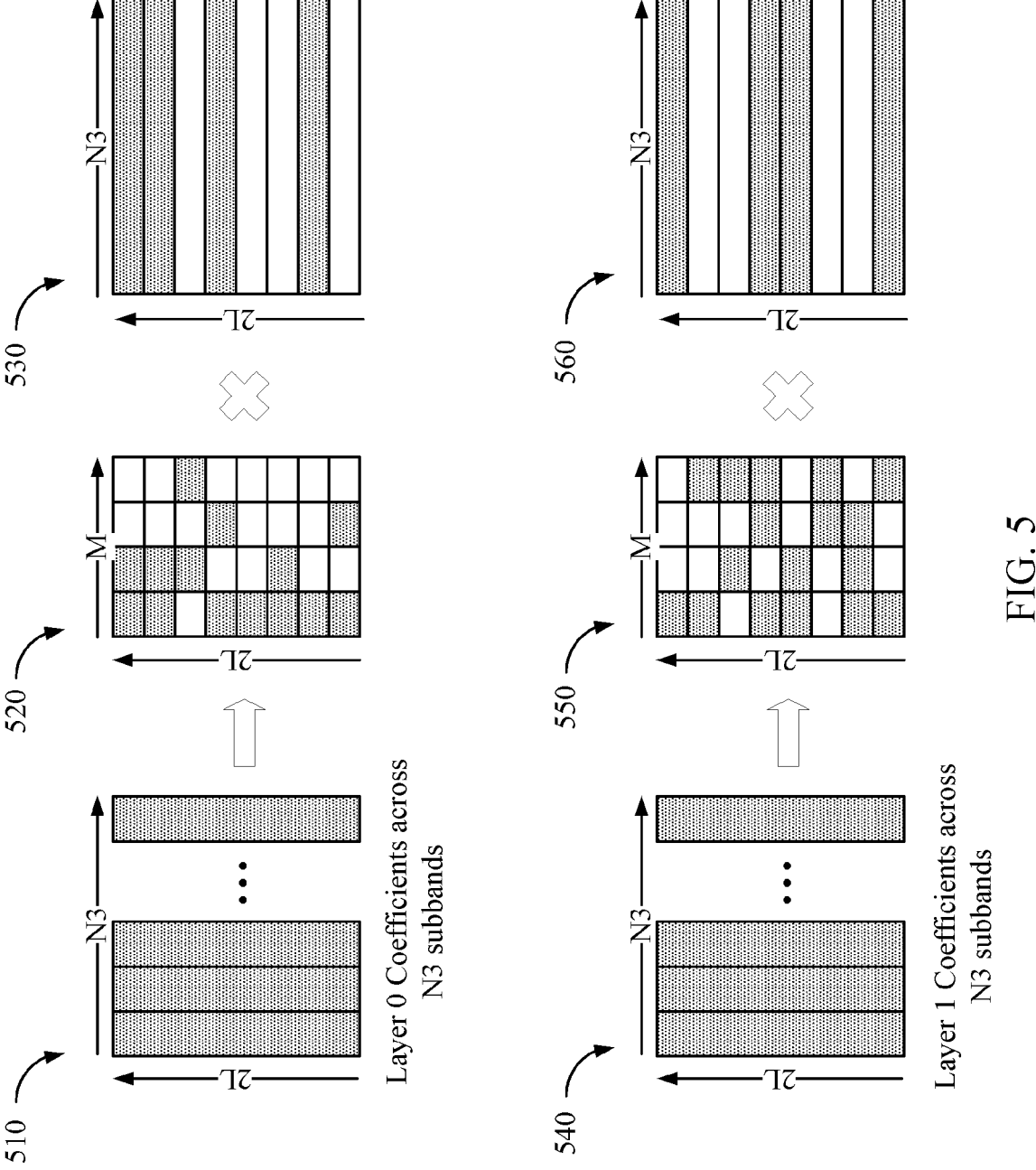
FIG. 5 illustrates a conceptual example of precoder matrices, in accordance with certain aspects of the present disclosure.

In certain systems (e.g., Rel-16 5G NR), the UE may be configured to report FD compressed precoder feedback to reduce overhead of the CSI report. As shown in FIG. 5, the precoder matrix ($W_{2,i}$) for layer i with i=0,1 may use an FD compression $$W_{f,i}^H$$

matrix to compress the precoder matrix into $\tilde{W}_{2,i}$ matrix size to $2L \times M$ (where M is network configured and communicated in the CSI configuration message via RRC or DCI, and $M < N_3$) given as:

$$W_i = W_1 \tilde{W}_{2,1} W_{f,i}^H$$

Where the precoder matrix $W_i$(not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network configured via RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} \le K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of $$W_{f,0}^H$$

matrix 530. In the example shown, both the $\tilde{W}_{2,0}$ matrix 520 at layer 0 and the $\tilde{W}_{2,0}$ matrix 550 at layer 1 are $2L \times M$.

The $$W_{f,0}^H$$

matrix 530 is composed of the basis vectors (each row is a basis vector) used to perform compression in frequency domain. In the example shown, both the $$W_{f,0}^H$$

matrix 530 at layer 0 and the $$W_{f,1}^H$$

matrix 560 at layer 1 include M=4 FD basis (illustrated as shaded rows) from $N_3$ candidate DFT basis. In some configurations, the UE may report a subset of selected basis of the $$W_{f,i}^H$$

matrix via CSI report. The M bases specifically selected at layer 0 and layer 1. That is, the M bases selected at layer 0 can be same/partially-overlapped/non-overlapped with the M bases selected at layer 1.

Example Type II Port-Selection CSI with Frequency Selective Precoded CSI-RS (a.k.a., FDD CSI)

Figure 6:
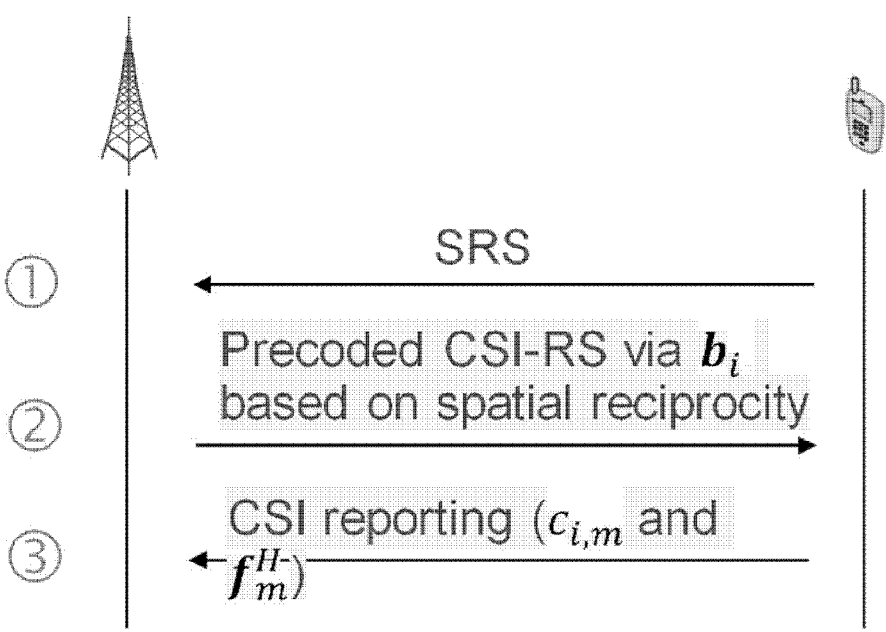
FIG. 6 is a call flow diagram illustrating a first example of Type II CSI feedback.
Figure 7:
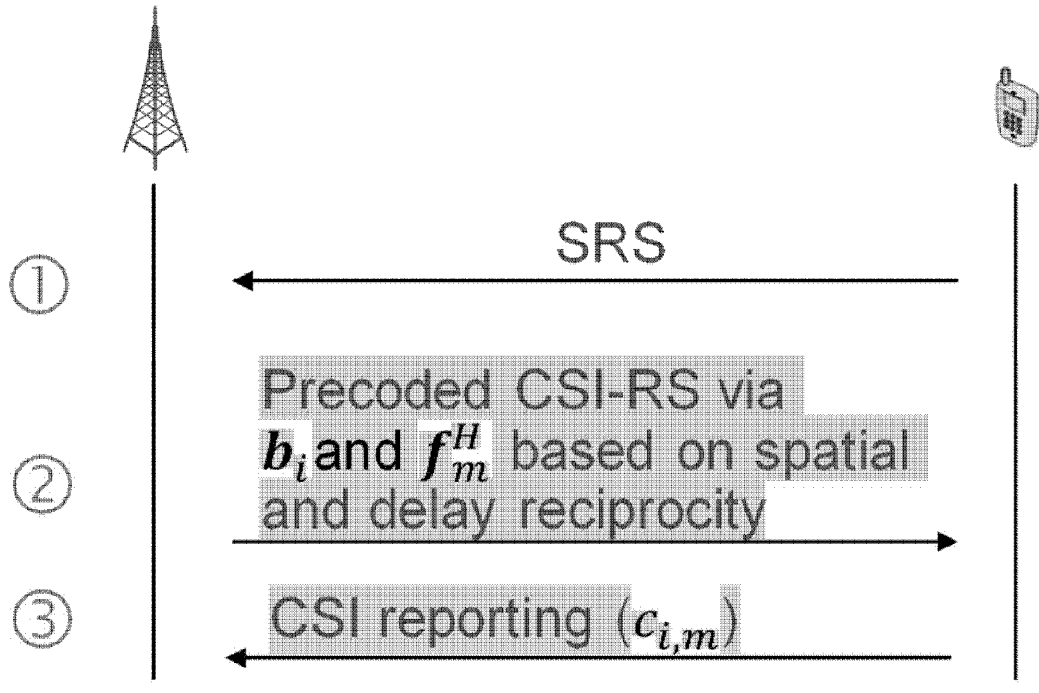
FIG. 7 is a call flow diagram illustrating a second example of Type II CSI feedback.

Some deployments (e.g., NR Release 16 and 17 systems) support enhancements to CSI based feedback that are designed to exploit directional (angle) and delay reciprocity (meaning the same or similar conditions may be assumed to be observed on the uplink and downlink). FIGS. 6 and 7 illustrate examples of such CSI based feedback where a gNB obtains the following terms based on a combination of SRS measurements taken at the gNB and feedback from the UE:

$b_i$: spatial domain basis;

$f_m^H$: frequency domain basis; and $c_{i,m}$: linear combination coefficients.

FIG. 6 is a call flow diagram illustrating an example of Type II port-selection CSI feedback (according to Release 16). The UE transmits SRS that the gNB measures to determine a spatial domain basis ($b_i$). Assuming spatial reciprocity, the gNB precodes CSI-RS via the spatial domain basis ($b_i$), wherein each CSI-RS port may be precoded via a particular spatial domain basis. Based on measurements of the precoded CSI-RS, the UE determines preferred CSI-RS ports and reports them and also reports other terms $$(c_{i,m} \text{ and } f_m^H)$$

used to combine the preferred CSI-RS ports.

The term CSI-RS port refers to an antenna port used for CSI-RS transmission. An antenna port is a logical concept related to physical layer (L1), rather than an actual physical RF antenna. According to the 3GPP specification definition, an antenna port is defined such that the channel over which a symbol on the antenna port is conveyed can be inferred from the channel over which another symbol on the same antenna port is conveyed. In other words, each individual downlink transmission is carried out from a specific antenna port, the identity of which is known to the UE and the UE can assume that two transmitted signals have experienced the same radio channel if and only if they are transmitted from the same antenna port. The mapping of antenna ports to physical antennas is generally controlled by beam forming as a certain beam needs to transmits the signal on certain antenna ports to form a desired beam. As such, it is possible that two antenna ports may be mapped to one physical antenna port or that a single antenna port may be mapped to multiple physical antenna ports.

FIG. 7 is a call flow diagram illustrating another example of Type II CSI feedback (according to Release 17). In this case, the gNB determines both (b_i) and $$f_m^H$$

based on SRS measurements. Assuming both spatial and delay reciprocity, the gNB precodes CSI-RS via the spatial domain basis (b_i) and the frequency domain basis $$f_m^H,$$

wherein each CSI-RS port maybe precoded via a particular pair of a spatial domain basis and a frequency domain basis. Based on measurements of the precoded CSI-RS, the UE determines preferred CSI-RS ports and reports them and also reports $c_{i,m}$ used to combine the preferred CSI-RS ports.

In scenarios where there is an ideal spatial and delay reciprocity in the uplink and downlink frequency band, such as time division duplexing (TDD) scenarios, the CSI reporting of FIG. 7 may have certain benefits. Examples of such benefits include lower reporting overhead, lower UE complexity, and higher performance due to finer resolution of frequency domain basis and higher performance due to better spatial and frequency bases (gNB can use bases other than DFT bases, e.g., SVD bases, to gain more performance benefit).

For the frequency selective precoding shown in FIG. 7, on an FD unit (RB or subband), the precoder of a CSI-RS port is formed by a pair of an SD basis (or spatial domain transmission filter) $b_i$ and an FD basis (frequency domain transmission filter/weight)$f_m$. When generating a wideband (WB) CSI report, for a given port p, the UE observes:

$$\hat{H}_p[n] = H b_{i(p)} f_{m(p)}^H[n] \text{ on } FD \text{ unit } n;$$

based on which the UE calculates CSI. In this equation, H is the wireless channel between UE and gNB without precoding, where i(p) and m(p) denote the indices of the spatial and frequency bases applied on port p, respectively.

For each layer, the UE selects a subset of total ports, and reports a single coefficient per port across the frequency band. The PMI for a certain layer on any of the $N_3$ FD units is given as:

$$W = \sum_{k=0}^{K_0-1} v_{i_k} \cdot c_k;$$

where $v_{i_k}$ is of size P×1 with only one "1" in row $i_k$, P is the total number of CSI-RS ports. The UE reports $$v_{i_0}, \dots v_{i_{K_0-1}}$$

and $c_0, \dots c_{K_0-1}$ or a subset of $c_0, \dots c_{K_0-1}$ wherein the unreported coefficients are set to 0, $K_0$ is the maximum number of ports allowed to be selected for linear combination.

Figure 8A:
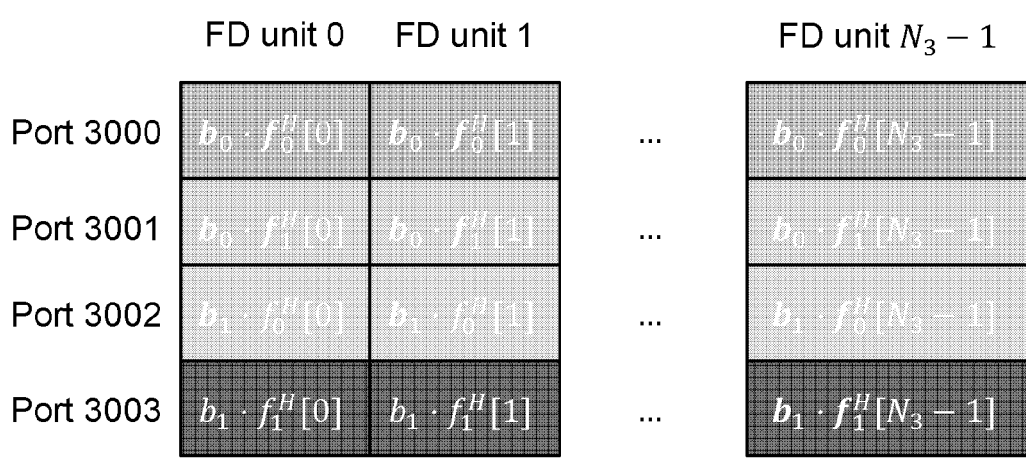
FIGS. 8A and 8B illustrate example ports and layer to port mapping.
Figure 8B:
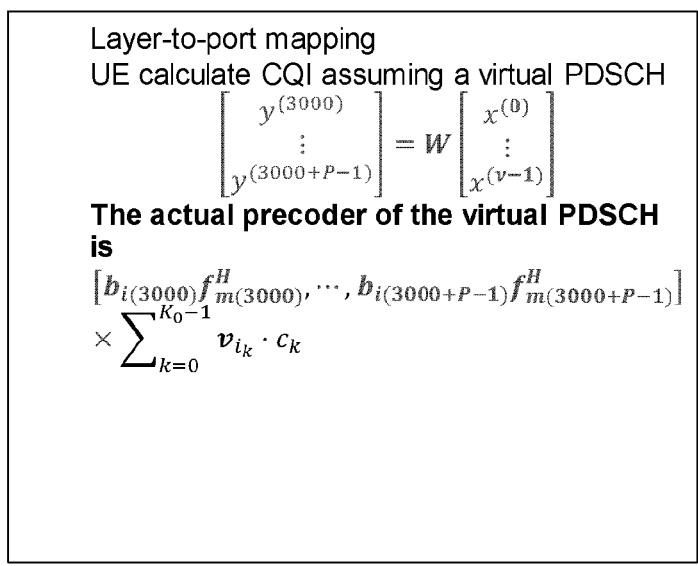

As illustrated in FIG. 8A, in current standards, the CSI-RS port index in each resource starts from 3000. As shown in FIG. 8B, the UE calculates CQI assuming a virtual PDSCH:

$$\begin{bmatrix} y^{(3000)} \\ \vdots \\ y^{(3000+P-1)} \end{bmatrix} = W \begin{bmatrix} x^{(0)} \\ \vdots \\ x^{(v-1)} \end{bmatrix};$$

and the actual precoder of the virtual PDSCH is given as:

$$\left[ b_{i(3000)} f_{m(3000)}^H, \dots, b_{i(3000+P-1)} f_{m(3000+P-1)}^H \right] \times \sum_{k=0}^{K_0-1} v_{i_k} \cdot c_k.$$

Figure 9:
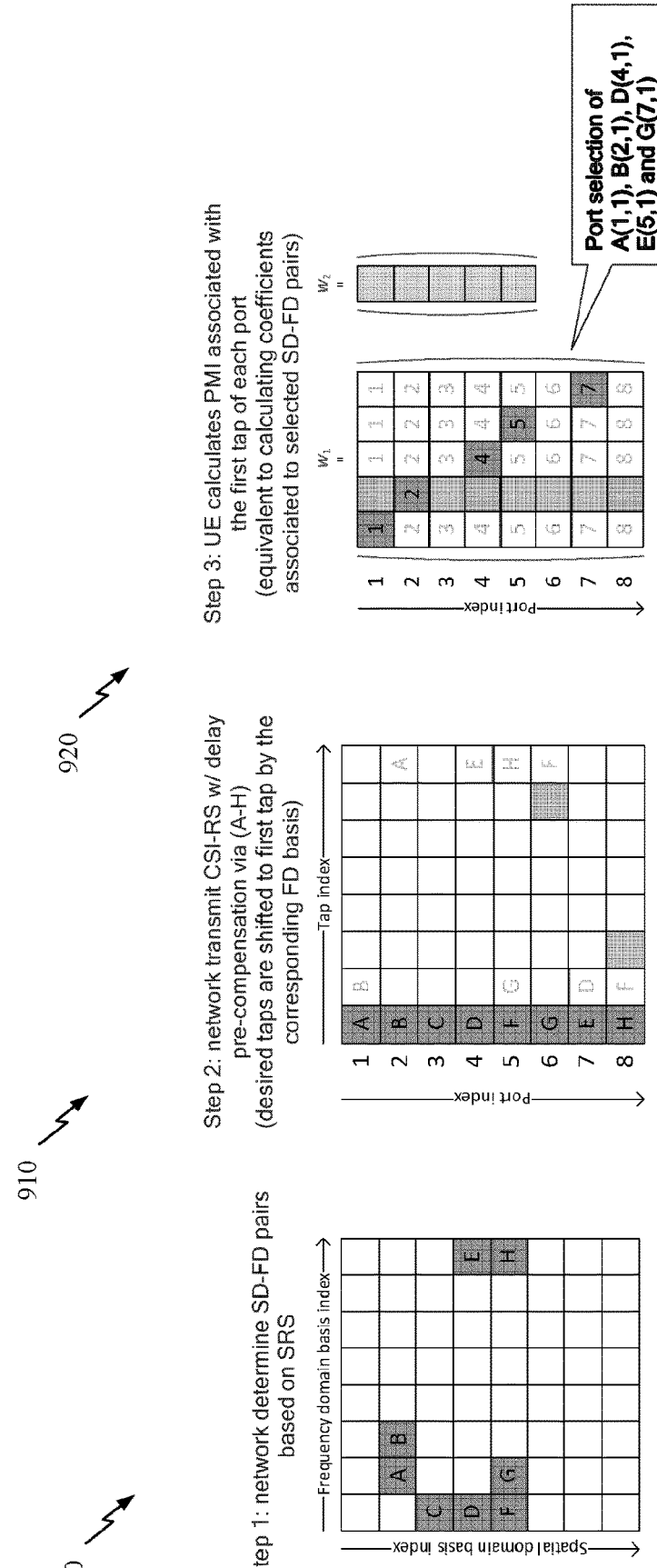
FIG. 9 illustrates an example of CSI calculation for port selection.

FIG. 9 illustrates an example of CSI configuration, measurement, and reporting for port selection. As shown at 900, the network may determine SD-FD basis pairs (which may be referred to as SD-FD pairs), based on SRS. In the example, 8 SD-FD pairs are determined. As shown at 910, the network may transmit 8 CSI-RS ports with delay precompensation via SD-FD pairs A-H. In the illustrated example, considering DFT bases are used for FD bases, the effect of delay pre-compensation is that the desired taps (associated with A-H) are shifted to a first tap by the corresponding FD basis. As shown at 920, the UE calculates PMI associated with the first tap of each port (e.g., which may be equivalent to calculating coefficients associated to selected SD-FD pairs). The illustrated example shows port selection of A(1,1), B(2,1), D(4,1), E(5,1) and G(7,1).

Example Methods for CSI-RS Resource Aggregation

Aspects of the present disclosure relate to wireless communications, and more particularly, to techniques for channel state information (CSI) reference signal (RS) resource aggregation. For example, CSI measurements can be performed in accordance with one or more resource mapping configurations to reduce CSI-RS resource configuration overhead.

Frequency division duplexing (FDD) reciprocity CSI may require a relatively large number of CSI-RS ports (e.g., 48 or 64 SD-FD basis pairs), but current standards only support 32 ports. FDD reciprocity CSI generally refers to the ability where the gNB determines SD-FD pairs based on UL sounding and uses these SD-FD pairs for DL CSI-RS precoding. The UE will then report the coefficients associated with each CSI-RS port or SD-FD basis pair.

The resource mappings may lead to greater flexibility and help in aggregating such a larger number of resources (e.g., supporting a larger number of ports than supported by current standards). The techniques presented herein may also help reduce CSI-RS overhead. This CSI-RS overhead reduction may be important as the number of resources increases because the CSI-RS used for FDD CSI is beam-formed, thus the CSI-RS is UE specific.

Certain aspects provide techniques for configuring CSI-RS resources of first set of CSI-RS ports or code division multiplexing (CDM) groups based on one or more resource mappings associated with one or more sets of ports. For example, a configuration received by the UE may indicate a code division multiplexing (CDM) type, a number of ports, resource element (RE) positions within a resource block (RB), a symbol position within a slot, and or CSI-RS port density.

FIG. 10 illustrates example operations 1000 for wireless communication by a UE. For example, operations 1000 may be performed by a UE 120 (of FIG. 1 or FIG. 3) for CSI-RS resource aggregation, in accordance with certain aspects of the present disclosure.

Operations 1000 begin, at 1002, by receiving information regarding a configuration of at least one CSI-RS resource, wherein the configuration of each CSI-RS resource comprises one or more resource mapping configurations. At 1004, the UE determines, from the information, resources for a first set of CSI-RS ports or CDM groups within the CSI-RS resource based at least in part on a first resource mapping, and resources for a second set of CSI-RS ports or CDM groups within the resource based at least in part on a second resource mapping.

As will be described in greater detail below, the information may indicate separate resource mapping configurations. Alternatively, the information may indicate a single resource mapping configuration and sufficient information to derive one or more other resource mapping configurations.

At 1006, the UE performs CSI measurement using the first and second sets of CSI-RS ports across the plurality of resource configurations.

FIG. 11 illustrates example operations 1100 that may be considered complementary to operations 1000 of FIG. 10. For example, operations 1100 may be performed by a network entity (e.g., a base station, such as an eNB or gNB), to configure and receive CSI reports from a UE (e.g., a UE performing operations 1000 of FIG. 10).

Operations 1100 begin, at 1102, by transmitting, to a UE, information regarding a configuration of at least one CSI-RS resource, wherein the configuration of each CSI-RS resource comprises one or more resource mapping configurations.

At 1104, the network entity transmits CSI-RS, in accordance with the information, on resources for a first set of CSI-RS ports or CDM groups within the CSI-RS resource based at least in part on a first resource mapping, and on resources for a second set of CSI-RS ports or CDM groups within the resource based at least in part on a second resource mapping.

At 1106, the network entity receives, from the UE, a report based on CSI measurement using the first and second sets of CSI-RS ports across the plurality of resource configurations.

Operations of FIGS. 10 and 11 may be understood with reference to the various tables and code shown in FIGS. 12-21, which illustrate various resource configurations (e.g., frequency location, time position, and/or density) or code corresponding to different resource mappings for different sets of resources for a first set of CSI-RS ports or CDM groups.

In certain aspects, a resource configuration may indicate at least a first resource mapping configuration and a second resource mapping configuration. As illustrated in FIG. 12, in some cases, there are at most 4 resource mapping configurations (CSI-RS-ResourceMapping) configured by a list (resourceMappingList-r17) of information elements (IEs). If a UE is a Rel-17 UE or an advanced UE able to perform CSI measurement for FDD CSI, the UE will read the at most 4 CSI-RS-ResourceMapping IEs configured via resourceMappingList-r17. Alternatively, in some cases, additional resource mappings may be explicitly indicated in a CSI-RS resource configuration. As illustrated in FIG. 12, in some cases, at most 3 additional resource mapping configurations (CSI-RS-ResourceMapping) configured by AdditionalResourceMappingList-r17 in additional to the existing CSI-RS-ResourceMapping configuration indicated by resourceMapping. If a UE is a Rel-17 UE or an advanced UE able to perform CSI measurement for FDD CSI, the UE will read the at most 3 additional CSI-RS-ResourceMapping IEs configured via AdditionalResourceMappingList-r17 together with the CSI-RS-ResourceMapping configuration indicated by resourceMapping.

Each of these resource mapping configurations (i.e., CSI-RS-ResourceMapping) may include parameters such as a CDM type (configured by cdm-Type), a number of ports (e.g., configured via nrofPorts, for the ports within a corresponding set of ports or CDM groups), RE positions within each RB (configured via frequencyDomainAllocation), symbol position in each slot (configured via firstOFDMSymbolIntimeDomain and firstOFDMSymbolInTimeDomain2), and/or CSI-RS port density (configured via density). In RE positions within each RB (configured via frequencyDomainAllocation), it will indicate the RE position of each CDM group within each RB. "row1", "row2" and "row4" refers to the CSI-RS resource configuration table in 211 spec. The symbol location indicates OFDM symbol location for each CDM group in a slot. The density configuration comprises 1) CSI-RS port density (i.e., a CSI-RS port appears every 1/d RBs, where d is the configured density value) and 2) RB-comb (i.e., the CSI-RS port appears on even RBs or odd RBs if density is 0.5). In some cases, the two resource mapping configurations may differ by at least one of the above parameters. Thus, some of the parameters included in one resource mapping configuration may be the same when compared to another resource mapping configuration. For example, the resource mapping configurations may have the same (or different) CDM type and different (or the same) number of ports. In certain aspects, the resource configuration may indicate the total number of resource mapping configurations and any additional resource mapping configurations for each set of ports (e.g., as shown in the code of FIG. 12).

FIGS. 13A-C illustrate various examples of different CSI-RS resources associated with first and second resource mappings (Resource mapping 1 indicated by a first CSI-RS- ResourceMapping and Resource mapping 2 indicated by a second CSI-RS-ResourceMapping) with different configured parameters.

As shown in FIG. 13A, the CSI-RS ports or CDM groups configured via resource mapping 1 and resource mapping 2 may have the same time resources (OFDM symbols), but occupy different RE positions. As shown in FIG. 13B, the CSI-RS ports or CDM groups configured via resource mapping 1 and resource mapping 2 may occupy the same frequency resources (same REs), but occupy different time resources. Although resource mappings 1 and 2 are shown to be in adjacent time resources, it should be appreciated that the resources need not be back-to-back, and the resource mappings may be separated by a time gap.

As shown in FIG. 13C, the CSI-RS ports or CDM groups configured via resource mappings 1 and 2 may have different density configurations (e.g., with density referring to the number of CSI-RS ports per resource). In the illustrated example, each resource mapping may have a density of 0.5. In this case, resource mapping 1 may be configured to be in even numbered RBs (assuming n is even (i.e., n mod 2=0)), and resource mapping 2 may be configured to be in odd numbered RBs.

Figure 14A:
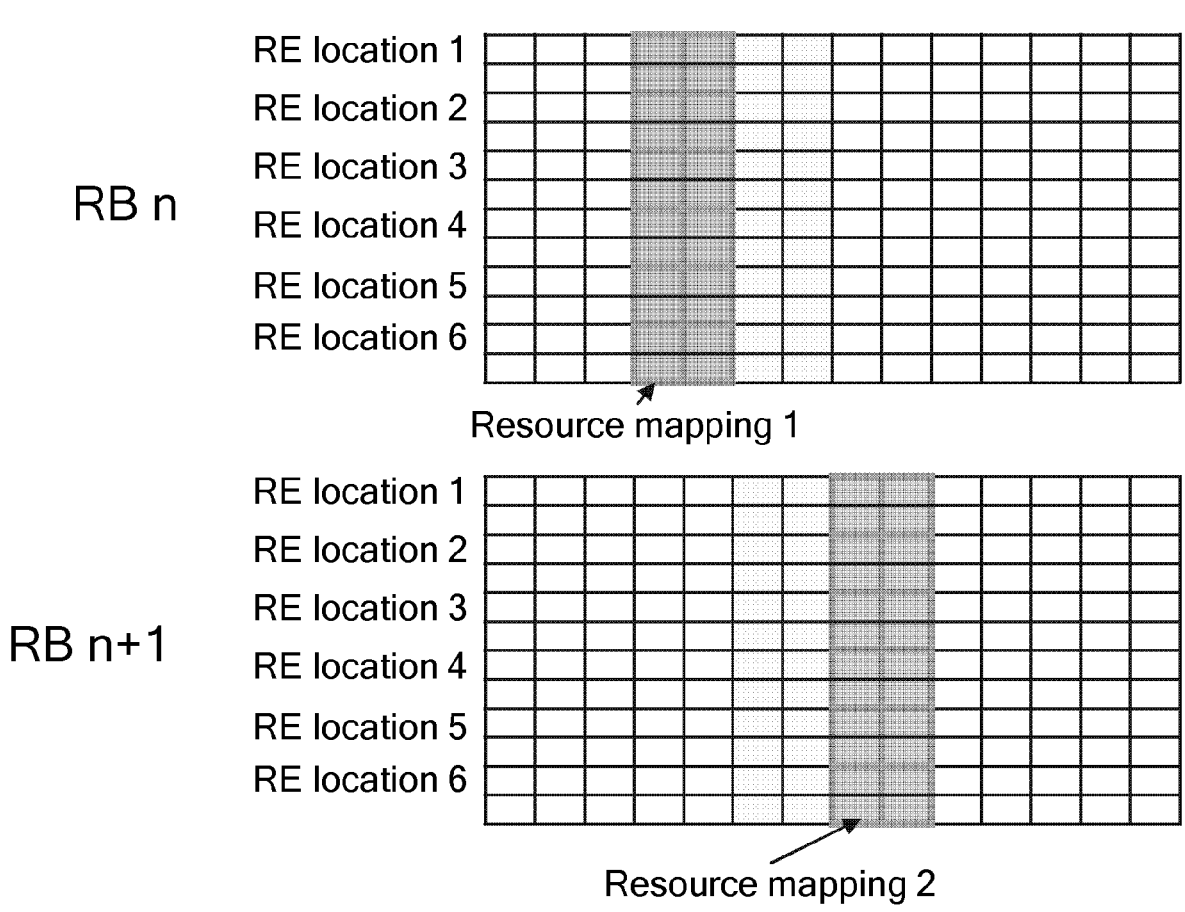
Figure 14B:
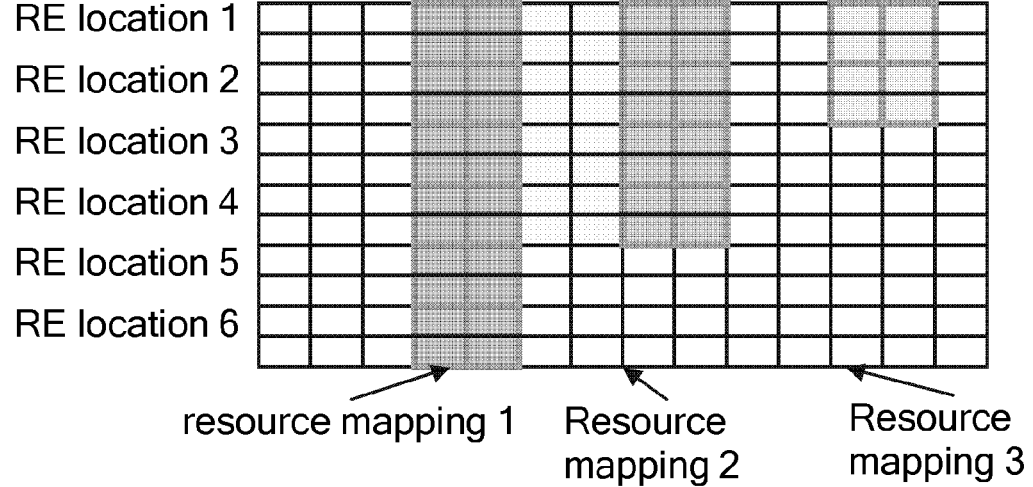

As shown in FIG. 14A, resource mappings 1 and 2 may be used to achieve different RB combs for different sets of CDM groups on different symbols. As used herein, the term comb generally refers to the frequency positions of CSI-RS on RB level (e.g., indicating an odd RB or even RB). As shown in FIG. 14B, different numbers of CDM groups in each port set or CDM group set may be configured to be during different symbols. As shown, resource mapping 1 may include 24 ports (12 CDM groups) corresponding to 6 RE locations starting from the 4th OFDM symbol, resource mapping 2 may include 16 ports (8 CDM groups) corresponding to 4 RE locations starting from the $8^{th}$ OFDM symbol, and resource mapping 3 may include 8 ports (4 CDM groups) corresponding to 2 RE locations starting from the $12^{th}$ OFDM symbol.

In certain aspects, since different resource mappings may have one or more parameters in common (e.g., same CDM type, same number of ports, same RE positions within each RB, same symbol position in each slot, and/or same CSI-RS port density), then only the different parameter(s) may be configured to save configuration overhead. Thus, the resource mapping for a first set of ports can be determined based on a first resource mapping configuration, and the resource mapping for a second set of ports can be based on based on the first resource mapping configuration and a second resource mapping configuration. In this case, the second (additional) resource mapping configuration may be indicated by (only) one or more parameters that are different for the second set of ports in comparison to the first set of ports.

In this case, the second resource mapping configuration can be considered as being configured jointly with the first resource mapping configuration. In other words, a set of parameters indicated in the first resource mapping configuration may be common to both/all of the resource mapping configurations and the additional resource mapping configuration may only include parameters that differ.

In some cases, the additional resource mapping configuration may only include RE positions within an RB. Thus, other parameters such as symbol location, density, CDM type, and number of ports would be indicated in the first resource mapping configuration. Such configuration can achieve the pattern shown in FIG. 13A.

In some cases, the additional resource mapping configuration includes symbol position(s) within a slot. Thus, other parameters such as RE position, density, CDM type, and number of ports may be indicated in the first resource mapping configuration. Such configuration can achieve the pattern shown in FIG. 13B.

In some cases, the additional resource mapping configuration includes the density configuration. In this case, the density configuration would be the same density for the second set of ports, but a different RB comb. Thus, other parameters such as RE position, symbol location, CDM type, and number of ports may be indicated in the first resource mapping configuration. Such configuration can achieve the pattern shown in FIG. 13C.

In certain aspects, the additional resource mapping configuration includes a number of additional resource mappings M'. The density and RB comb for the second set of ports may be determined based on M', as well as the density and RB comb configured for the first set of ports based on the first resource mapping configuration. For example, if the density is 0.5, the first resource mapping configuration indicates even RBs for the RB comb, and M' is 1, then the second resource mapping could be determined to be odd RBs. In another example, if the density is 0.25, the first resource mapping configuration indicates a first RB comb (e.g., RB-comb1), and M' is 1, then the second resource mapping could be determined to be a different RB comb (e.g., RB-comb3). In yet another example, if the density is 0.25, the first resource mapping configuration indicates a first RB comb (e.g., RB-comb1), and M' is 3, then the second resource mapping could be determined to be RB-comb2, the third resource mapping could be determined to be RB-comb3, and the fourth resource mapping could be determined to be RB-comb4.

Thus, more generally, if the density is some value d (e.g., the total number of RB combs=1/d), and if RB-combX is configured in the first resource mapping configuration, and M' additional resource mappings, then the $k^{th}$ resource mapping (e.g., k={1, 2, 3, . . . M'−1, M', M'+1}) is on RB-combY, where $$Y = \mathrm{mod}\left( X + \left( \frac{\frac{1}{d}}{M'+1} \right) \times (k-1), \frac{1}{d} \right) + 1.$$

As noted above, in current standards, there may only be a single resource mapping configuration for each resource (i.e., single CSI-RS-ResourceMapping configured via resourceMapping as shown in FIG. 12). Furthermore, a port index (used for resource mapping) may start from ports within each CDM group, moving across CDM groups. With this indexing, a UE assumes that a CSI-RS is transmitted using antenna ports p numbered according to:

$$p = 3000 + s + jL$$

$$j = 0, 1, \dots, \frac{N}{L} - 1$$

$$s = 0, 1, \dots, L - 1$$

where N=total CSI-RS ports in the resource, L=CDM size, and N/L=number of CDM groups. Given the different resource mappings per resource supported in the techniques proposed herein, CSI-RS port indexing may start from ports within each CDM group within each resource mapping, then move across CDM groups in the same resource mapping configuration, and finally moving across resource mapping configuration. That is, the port mapping may also be based on a resource mapping index k, as follows:

$$p = 3000 + s + jL + kN'$$
$$k = 0, 1, \ldots, N/N'$$
$$j = 0, 1, \ldots, \frac{N'}{L} - 1$$
$$s = 0, 1, \ldots, L - 1$$

where k=index of resource mapping, N=total CSI-RS ports in the resource, N'=#CSI-RS ports per resource mapping, L=CDM size, N'/L=number of CDM groups, and N/N'=number of resource mappings.

As noted above, in certain aspects, the resource configuration may include a single resource mapping configuration (e.g., the first resource mapping and second resource mapping described above are the same or included in the same (larger) resource mapping configuration, configured via single CSI-RS-resourceMapping IE indicated by resourceMapping as shown in FIG. 12, but there are multiple (additional) configurations for RE positions, and/or symbol locations, and/or density configurations). For example, as illustrated in FIG. 15, this resource mapping configuration may indicate a first set of RE locations for a first set of CDM groups via the existing frequencyDomainAllocation and a second set of RE locations for a second set of CDM groups via an additional existing frequencyDomainAllocation2. If a UE is a Rel-17 UE or an advanced UE able to perform CSI measurement associated to FDD CSI, the UE will read the existing frequencyDomainAllocation for the first set of CDM groups, and read frequencyDomainAllocation2 for the second set of CDM groups.

In some cases, as illustrated in FIG. 15, the resource mapping configuration may indicate a first set of symbol locations for the first set of CDM groups via the existing firstOFDMSymbolInTimedomain and/or firstOFDMSymbolInTimedomain2 and a second set of symbol locations for the second set of CDM groups via firstOFDMSymbolInTimedomain3 and/or firstOFDMSymbolInTimedomain4. In this case, each symbol location indication may include of a first starting orthogonal frequency division multiplexing (OFDM) symbol and/or a second starting OFDM symbol. If a UE is a Rel-17 UE or an advanced UE able to perform CSI measurement associated to FDD CSI, the UE will read the existing firstOFDMSymbolInTimedomain and/or firstOFDMSymbolInTimedomain2 for the first set of CDM groups, and read firstOFDMSymbolInTimedomain3 and/or firstOFDMSymbolInTimedomain4 for the second set of CDM groups.

In some cases, as illustrated in FIG. 15, the resource mapping configuration may indicate a density and RB-comb for the first set of CDM groups via the existing density ID and, a density and RB-comb for the second set of CDM groups via the additional density2 IE. If a UE is a Rel-17 UE or an advanced UE able to perform CSI measurement associated to FDD CSI, the UE will read the existing density IE for the first set of CDM groups, and read the additional density2 IE for the second set of CDM groups In certain aspects, the resource mapping may indicate a number of ports (P) that is greater than the total number of REs (N) indicated by the RE locations and symbol locations.

In such cases, there may be M'=P/N sets of CDM groups. The RB location of the first set may be given by the density d and RB-combX configuration, and the $k^{th}$ resource mapping (e.g., k={1, 2, 3, ... M'−1, M'}) may be on RB-combY, where $$Y = \mod\left(X + \left(\frac{\frac{1}{d}}{M' + 1}\right) \times (k - 1), \frac{1}{d}\right) + 1.$$

In some cases, if the resource configuration indicates a single value for a parameter, all CDM group sets may share that common value. For example, if a single RE location is indicated, all CDM group sets may share the same RE location. If a single symbol location is indicated, all CDM group sets may share the same symbol location. If configured with a single density and RB-comb indication, all CDM group sets may share the same density and RB-comb. In such cases, however, the number of CDM groups in each set can be different.

FIG. 15 illustrates an example of a single CSI-RS resource mapping configuration, in accordance with aspects of the present disclosure. As shown, the configuration may include functionality for a RE location for CDM groups for a second set of CDM groups, a symbol location for CDM groups for a second set of CDM groups, and a density/RB-comb for a second set of CDM groups.

Figures 16A, 16B, 16C:
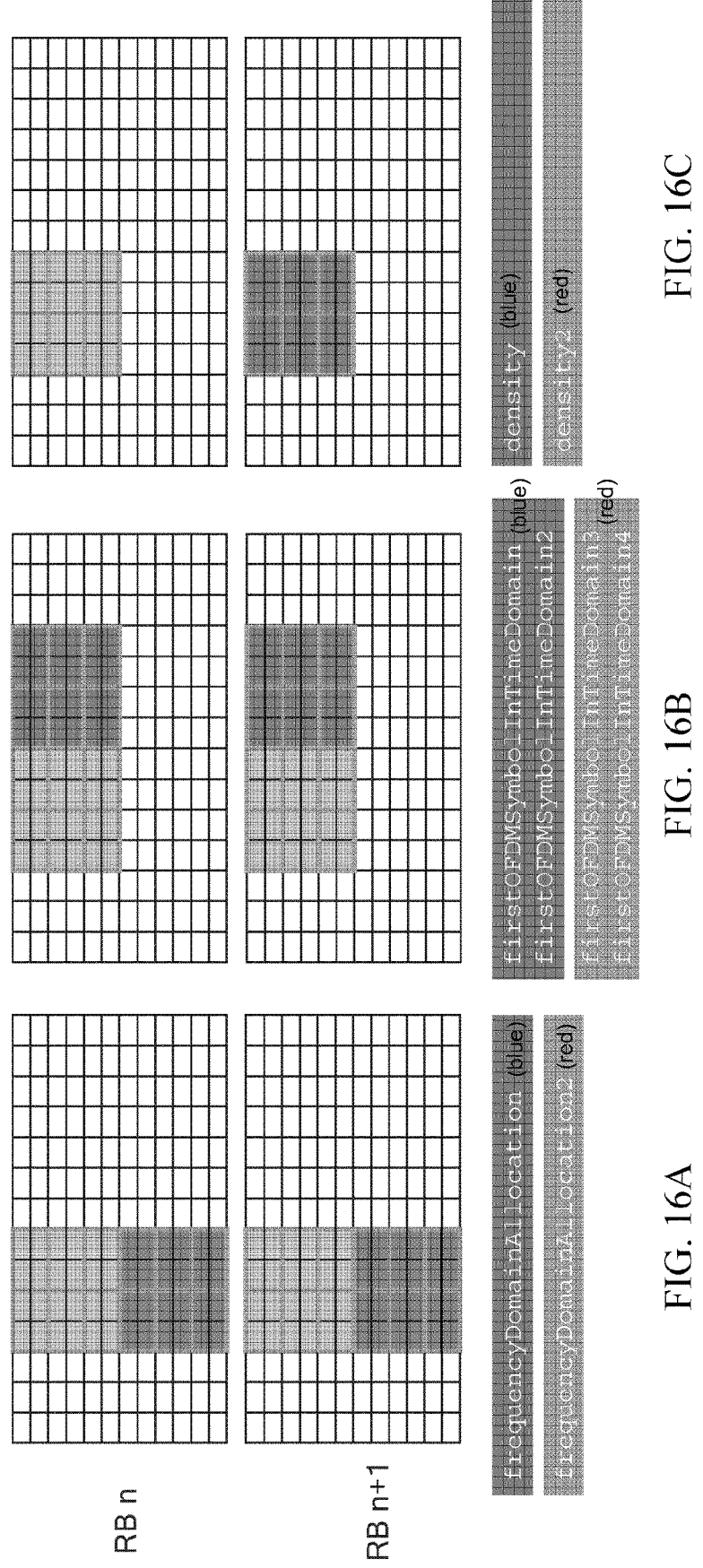

This is illustrated in FIGS. 16A-16C, which are examples of how the same CSI-RS resource mappings as shown in FIGS. 13A-13C (achieved with two resource mapping configurations) may be achieved with a single resource mapping configuration. As shown in FIG. 16A, two different resource mappings can be configured with different RE (frequency) positions (e.g., ports and CDM groups in blue are indicated via frequencyDomainAllocation and ports and CDM groups in red are indicated via frequencyDomainAllocation2 parameters). As shown in FIG. 16B, two different resource mappings can be configured with different symbol (time domain) positions (e.g., indicated via firstOFDMSymbolIn-TimeDomain and/or firstOFDMSymbolInTimeDomain2 for the first set of CDM groups (blue) and via firstOFDMSymbolInTimeDomain3 and/or firstOFDMSymbolInTimeDomain4 for the second set of CDM groups (red). Alternatively, via firstOFDMSymbolInTimeDomain for the first set of CDM groups (blue) and via firstOFDMSymbolInTimeDomain2 for the second set of CDM groups (red). As shown in FIG. 16C, two different resource mappings can be configured with different density configurations (e.g., existing density IE for the ports or CDM groups in blue and the additional density2 for the ports and CDM groups in red with the same density of 0.5 but different RB combs (even versus odd)).

Figure 17A:
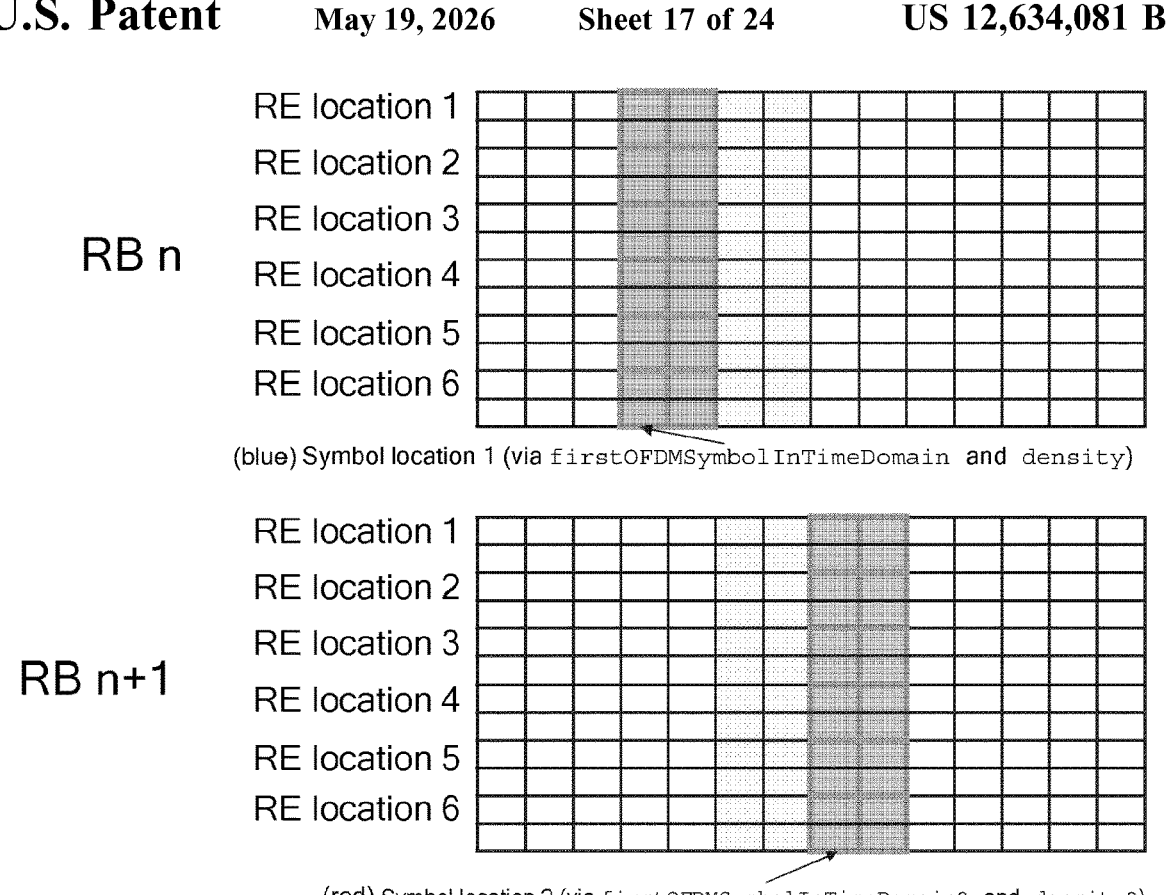
Figure 17B:
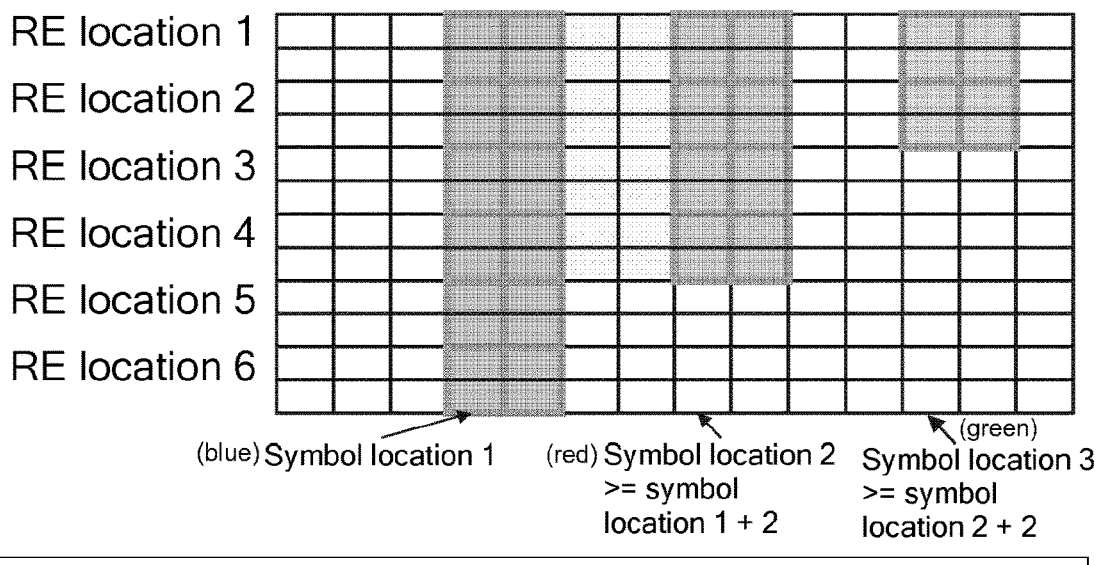

FIGS. 17A and 17B illustrate examples of CSI-RS resource aggregation similar to the CSI-RS resource aggregation depicted in FIGS. 14A and 14B; however the schemes depicted in FIGS. 17A and 17B are instead implemented by using only one resource mapping configuration (e.g., indicating both a first and second resource mapping configuration). As shown in FIG. 17A, different RB combs for different sets of CDM groups on different symbols may be achieved using different sets of parameters (via firstOFDM-SymbolInTimeDomain and density in one set (blue) and via firstOFDMSymbolInTimeDomain2 and density2 for the other set (red)). As shown in FIG. 17B, different numbers of CDM groups in each sets of ports or set of CDM groups may be configured to be during different symbols (e.g., by indicating different symbol locations for ports and CDM groups in blue, red and green, each associated with a different number of CDM groups).

Figure 18A:
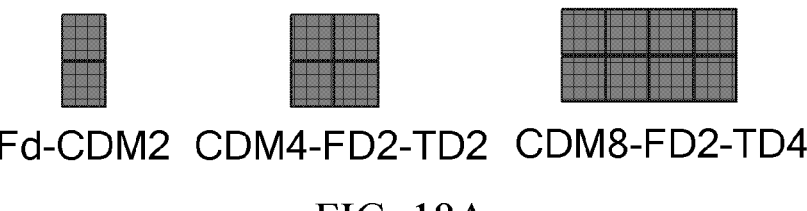
Figure 18B:
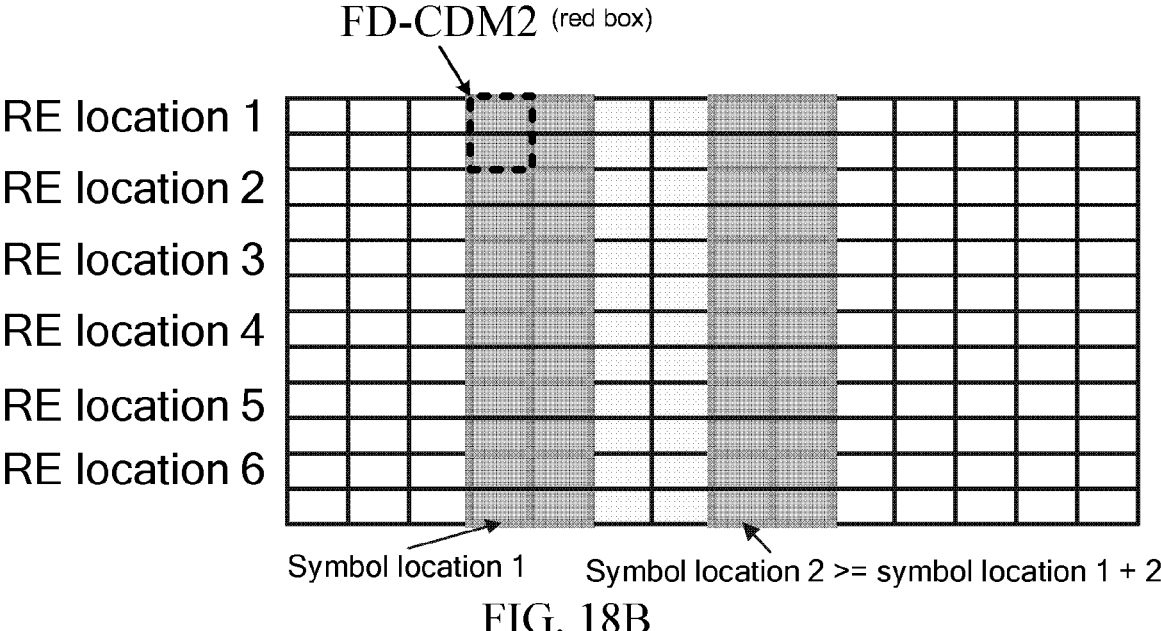
Figure 18C:
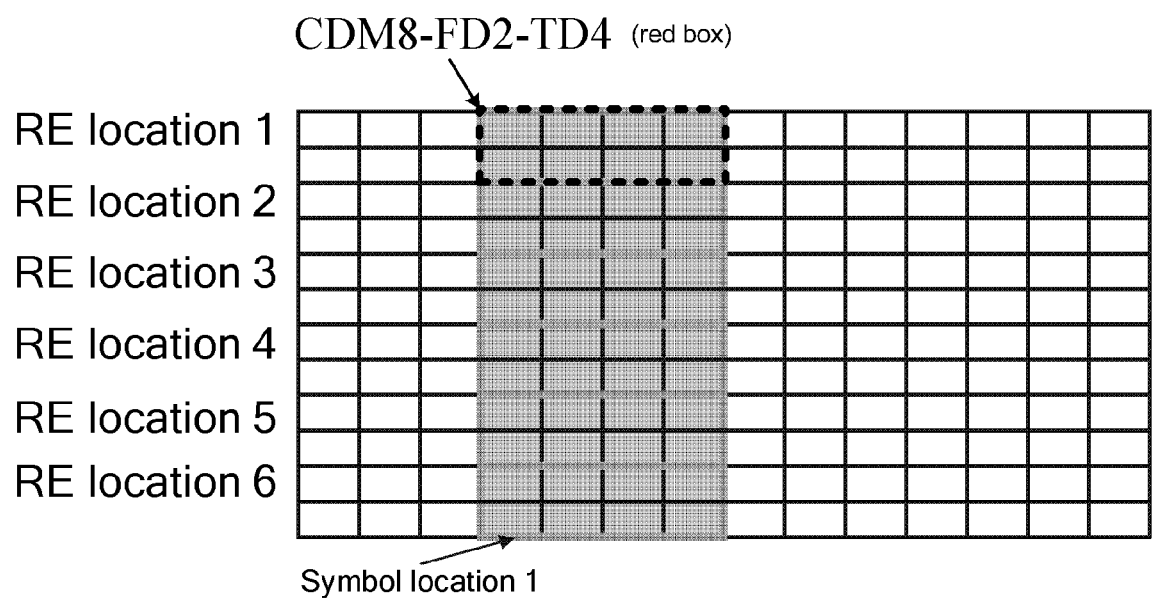
Figure 19A:
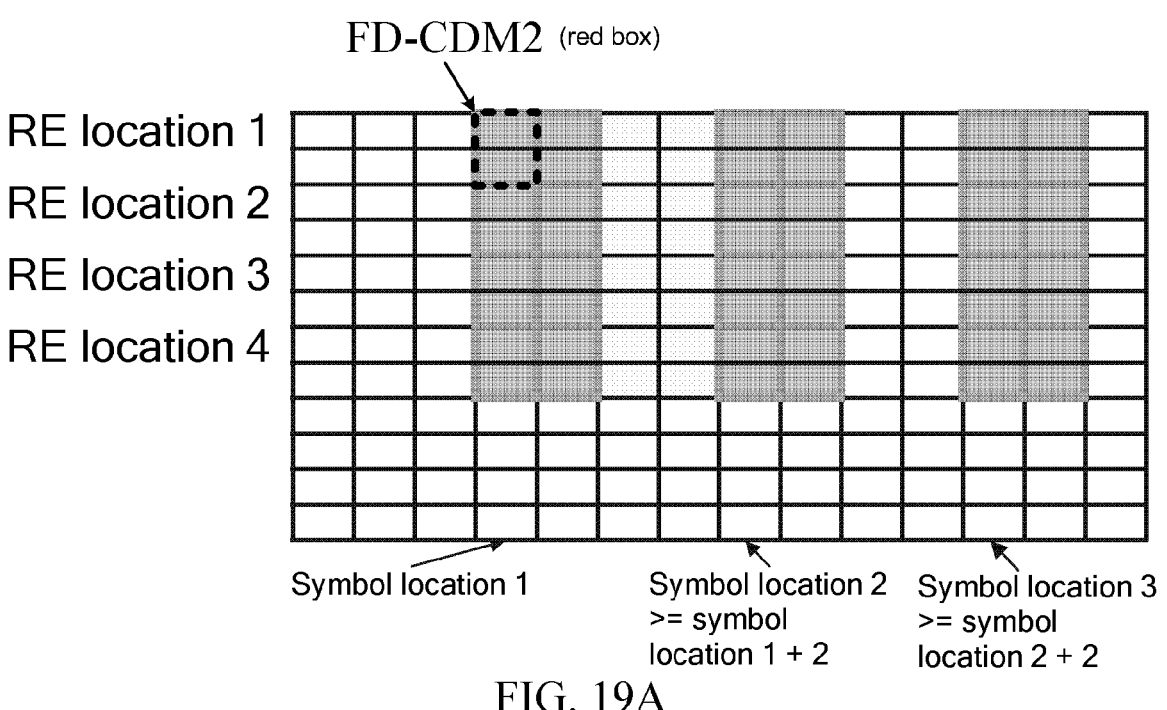
Figure 19B:
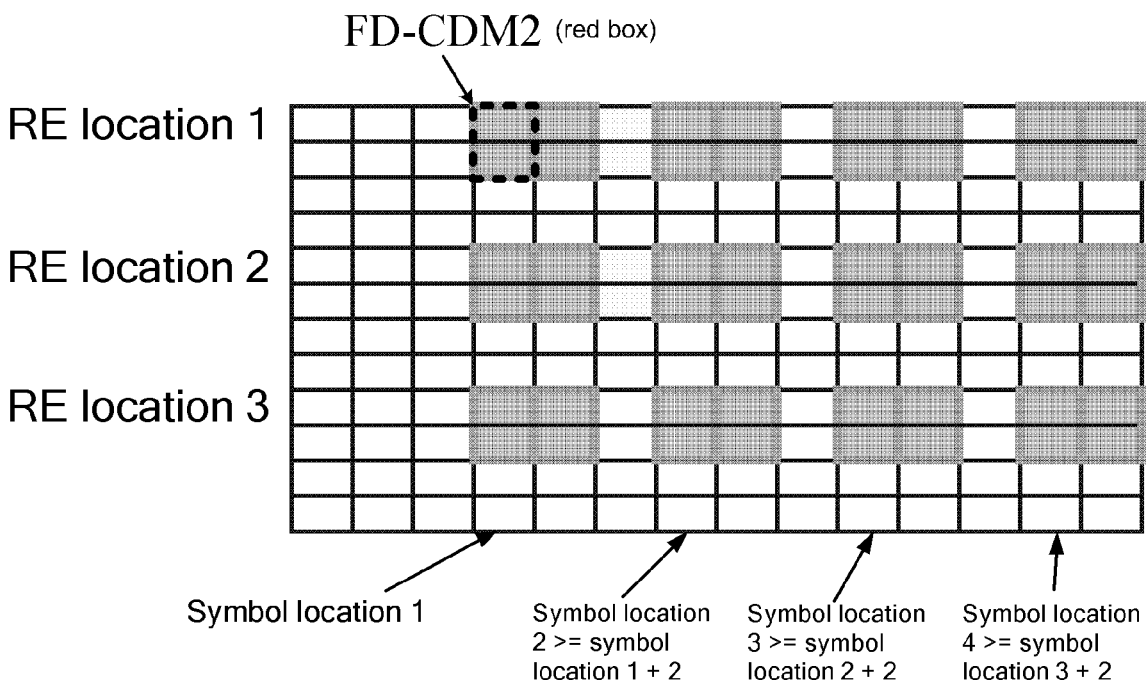
Figure 20:
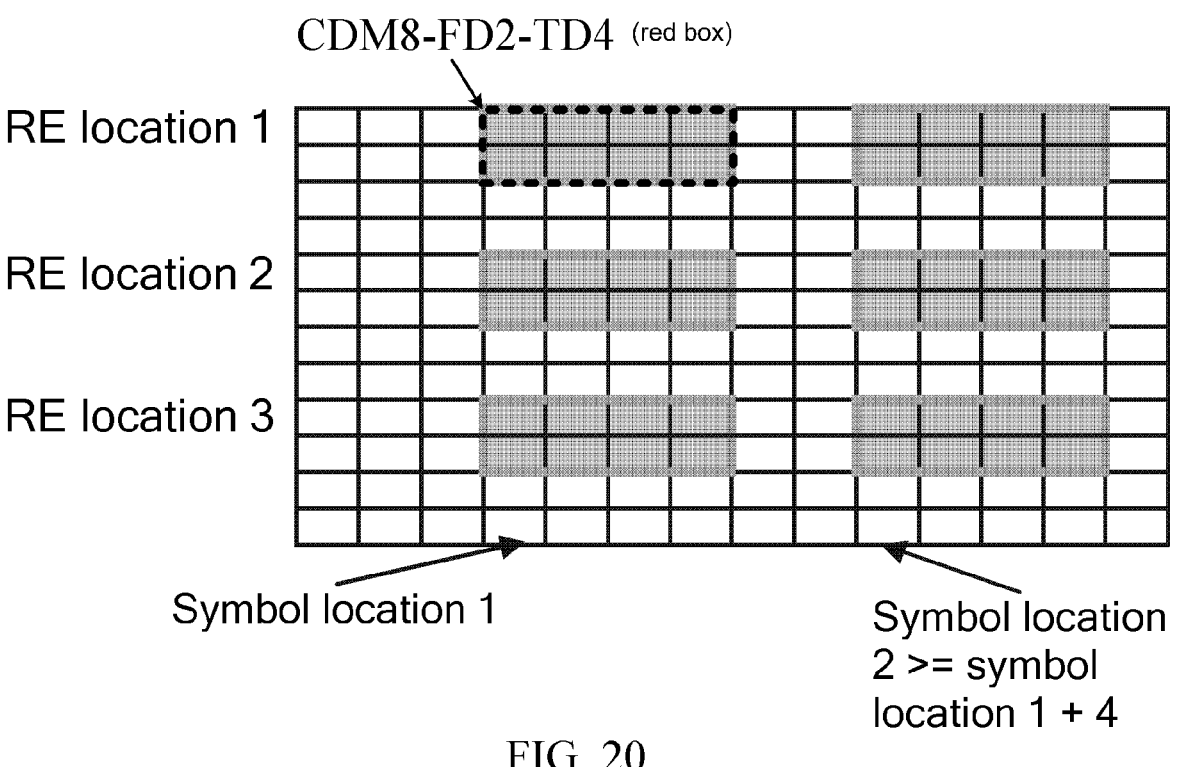

As described herein, aspects of the present disclosure may help support 48 and 64 port resources. FIGS. 18-20 illustrate various examples of 48 port CSI-RS resource aggregation. Each of the configurations depicted are implemented with a density of 1, however, for example, they may be implemented with other densities of 0.25 or 0.5. Different CDM configurations may be used to support a high number of ports. For example, as illustrated in FIG. 18A, FD-CDM2 (or CDM2) with two REs in the frequency domain and 1 symbol in the time domain, CDM4-FD2-TD2 (or CDM4) with two REs in the frequency domain and 2 symbols in the time domain, and CDM8-FD2-TD4 (or CDM8) with two REs in the frequency domain and 4 symbols in the time domain may be used for different configurations. In the figures described below (FIGS. 18B-18C, 19A-19B, 20A-20B, and 21A-21E), each red box corresponds to a CDM group.

In some cases, 48 ports may be mapped to 12 frequency resources and 4 time domain resources (12 REs×4 symbols). As shown in FIG. 18B, if FD-CDM2 is configured, there may be indications of 6 RE locations via the higher-layer parameter frequencyDomainAllocation and 2 symbol locations (assuming every two symbols are adjacent) via the higher-layer parameter firstOFDMSymbolInTimeDomain and firstOFDMSymbolInTimeDomain2. Similarly, if CDM4-FD2-TD2 is configured (though not shown), there may be indications of 6 RE locations via the higher-layer parameter frequencyDomainAllocation and 2 symbol locations (again assuming every two symbols are adjacent). The starting symbol indicated by firstOFDMSymbolInTimeDomain2 should be at least two symbols away from the starting symbol indicated by firstOFDMSymbolInTimeDomain. As shown in FIG. 18C, if CDM8-FD2-TD4 is configured, there may be an indication of 6 RE locations via the higher-layer parameter frequencyDomainAllocation and 1 symbol location (assuming the four symbols are adjacent) via the higher-layer parameter firstOFDMSymbolInTimeDomain.

In some cases, 48 ports may be mapped to 8 frequency resources and 6 time domain resources (8 REs×6 symbols). As shown in FIG. 19A, if FD-CDM2 is used, there may be indications of 4 RE locations via the higher-layer parameter frequencyDomainAllocation and 3 symbol locations (assuming every two symbols are adjacent) via the higher-layer parameter firstOFDMSymbolInTimeDomain, firstOFDMSymbolInTimeDomain2 and firstOFDMSymbolInTimeDomain3. Similarly, if CDM4-FD2-TD2 is used (though not shown), there may also be indications of 4 RE locations via the higher-layer parameter frequencyDomainAllocation and 3 symbol locations (again assuming every two symbols are adjacent) via the higher-layer parameter firstOFDMSymbolInTimeDomain, firstOFDMSymbolInTimeDomain2 and firstOFDMSymbolInTimeDomain3. The gap between each of the starting symbols indicated by firstOFDMSymbolInTimeDomain, firstOFDMSymbolInTimeDomain2 and firstOFDMSymbolInTimeDomain3 should be at least 2 symbols.

Another option for 48 ports is for a 6 RE×8 symbol mapping. As illustrated in FIG. 19B, in this case if FD-CDM2 is used, there may be indications of 3 RE locations via the higher-layer parameter frequencyDomainAllocation and 2 symbols (assuming every 4 symbols) via the higher-layer parameter firstOFDMSymbolInTimeDomain and firstOFDMSymbolInTimeDomain2 or 4 symbol locations (assuming every 2 symbols are adjacent) via the higher-layer parameter firstOFDMSymbolInTimeDomain, firstOFDMSymbolInTimeDomain2, firstOFDMSymbolInTimeDomain3 and firstOFDMSymbolInTimeDomain4. Similarly, if CDM4-FD2-TD2 is used (though not shown), there may also be indications of 3 RE locations via the higher-layer parameter frequencyDomainAllocation and 2 symbols (again assuming every 4 symbols are adjacent) via the higher-layer parameter firstOFDMSymbolInTimeDomain and firstOFDMSymbolInTimeDomain2 or 4 symbol locations (again assuming every 2 symbols are adjacent) via the higher-layer parameter firstOFDMSymbolInTimeDomain, firstOFDMSymbolInTimeDomain2, firstOFDMSymbolInTimeDomain3 and firstOFDMSymbolInTimeDomain4. As shown in FIG. 20, if CDM8-FD2-TD4 is used, there may be an indication of 3 RE locations via the higher-layer parameter frequencyDomainAllocation and 2 symbol locations (again assuming every 4 symbols are adjacent) via the higher-layer parameter firstOFDMSymbolInTimeDomain and firstOFDMSymbolInTimeDomain2.

Figures 21A, 21B, 21C:
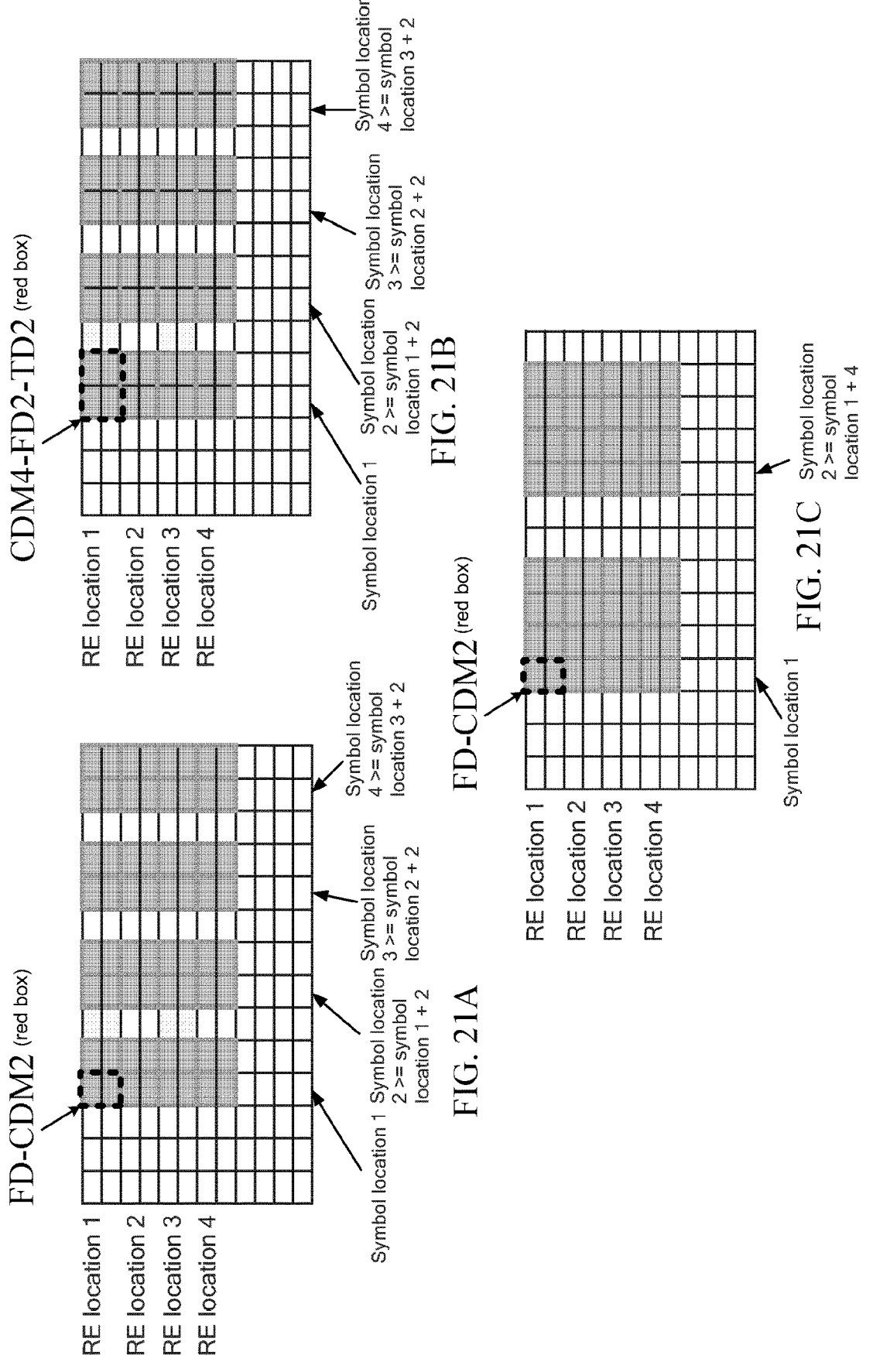
Figure 21D:
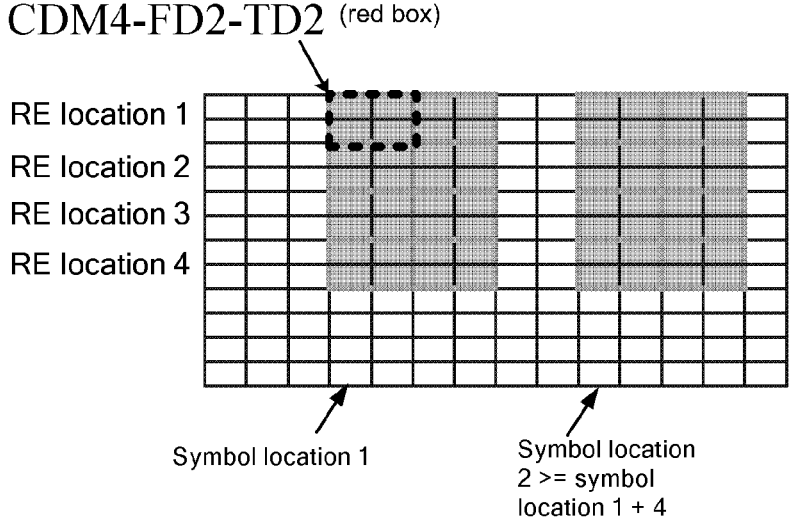
Figure 21E:
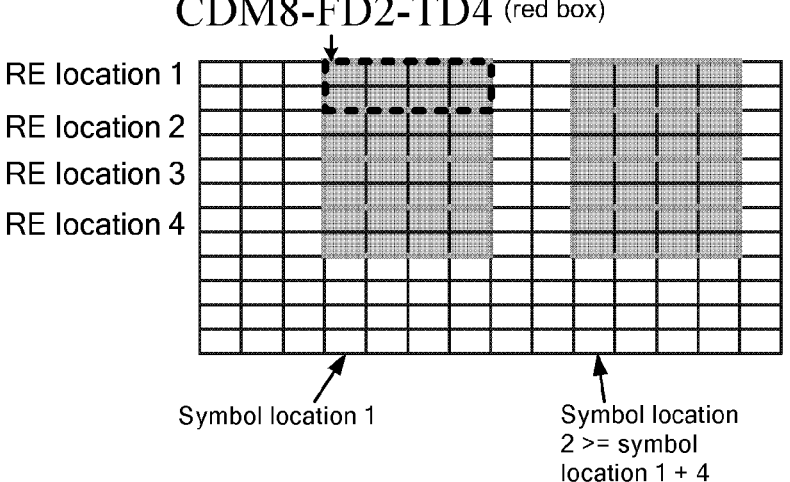

In some cases, 64 ports may be mapped to 8 frequency resources and 8 time domain resources (8 REs×8 symbols). As shown in FIGS. 21A and 21C, if FD-CDM2 is used, there may be indications of 4 RE locations via the higher-layer parameter frequencyDomainAllocation and 4 symbol locations (assuming every two symbols are adjacent as shown in FIG. 21A) via the higher-layer parameter firstOFDMSymbolInTimeDomain, firstOFDMSymbolInTimeDomain2, firstOFDMSymbolInTimeDomain3 and firstOFDMSymbolInTimeDomain4 or 2 symbol locations (assuming every four symbols are adjacent as shown in FIG. 21C) via the higher-layer parameter firstOFDMSymbolInTimeDomain and firstOFDMSymbolInTimeDomain2. Similarly, as shown in FIGS. 21B and 21D, if CDM4-FD2-TD2 is used, there may also be indications of 4 RE locations via the higher-layer parameter frequencyDomainAllocation and 4 symbol locations (assuming every two symbols are adjacent as shown in FIG. 21B) via the higher-layer parameter firstOFDMSymbolInTimeDomain, firstOFDMSymbolInTimeDomain2, firstOFDMSymbolInTimeDomain3 and firstOFDMSymbolInTimeDomain4 or 2 symbol locations (assuming every four symbols are adjacent as shown in FIG. 21D). As shown in FIG. 21E, if CDM8-FD2-TD4 is used, there may be an indication of 4 RE locations via the higher-layer parameter frequencyDomainAllocation and 2 symbol locations via the higher-layer parameter firstOFDMSymbolInTimeDomain and firstOFDMSymbolInTimeDomain2.

FIG. 22 illustrates a communications device 2200 that may include various components (e.g., corresponding to means-plus-function components) configured to perform operations for the techniques disclosed herein. For example, the device 2200 may be a UE configured to perform operations illustrated in FIG. 10. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 10, or other operations for performing the various techniques discussed herein. In certain aspects, computer-readable medium/memory 2212 stores code 2214 for receiving information regarding a configuration of at least one CSI-RS resource, wherein the configuration of each CSI-RS resource comprises one or more resource mapping configurations; code 2216 for determining, from the information, resources for a first set of CSI-RS ports or CDM groups within the CSI-RS resource based at least in part on a first resource mapping, and resources for a second set of CSI-RS ports or CDM groups within the resource based at least in part on a second resource mapping; and code 1218 for performing CSI measurement using the first and second sets of CSI-RS ports across the plurality of resource configurations. In certain aspects, the processor 2204 has circuitry configured to implement the code stored in the computer-readable medium/memory 2212. The processor 2204 includes circuitry 2220 for receiving information regarding a configuration of at least one CSI-RS resource, wherein the configuration of each CSI-RS resource comprises one or more resource mapping configurations; circuitry 2222 for determining, from the information, resources for a first set of CSI-RS ports or CDM groups within the CSI-RS resource based at least in part on a first resource mapping, and resources for a second set of CSI-RS ports or CDM groups within the resource based at least in part on a second resource mapping; and circuitry 2224 for performing CSI measurement using the first and second sets of CSI-RS ports across the plurality of resource configurations.

Figure 23:
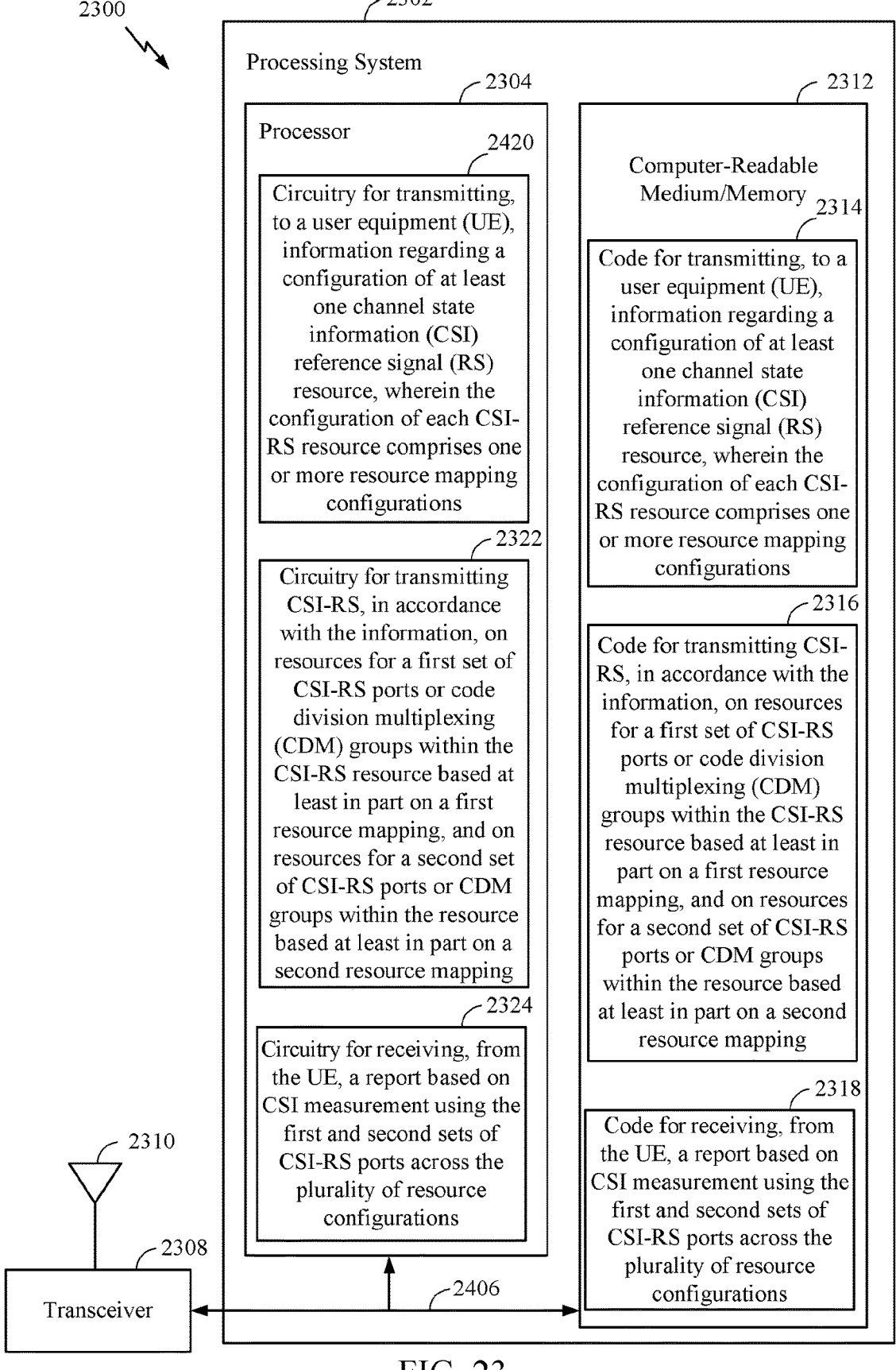
FIG. 23 illustrates a device with example components capable of performing various operations in accordance with certain aspects of the present disclosure.

FIG. 23 illustrates a communications device 2300 that may include various components (e.g., corresponding to means-plus-function components) configured to perform operations for the techniques disclosed herein. For example, the device 2300 may be a network entity (e.g., a BS) configured to perform operations illustrated in FIG. 11. The communications device 2300 includes a processing system 2302 coupled to a transceiver 2308 (e.g., a transmitter and/or a receiver). The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 11, or other operations for performing the various techniques discussed herein. In certain aspects, computer-readable medium/memory 2312 stores code 2314 for transmitting, to a UE, information regarding a configuration of at least one CSI-RS resource, wherein the configuration of each CSI-RS resource comprises one or more resource mapping configurations; code 2316 for transmitting CSI-RS, in accordance with the information, on resources for a first set of CSI-RS ports or CDM groups within the CSI-RS resource based at least in part on a first resource mapping, and on resources for a second set of CSI-RS ports or CDM groups within the resource based at least in part on a second resource mapping; and code 2318 for receiving, from the UE, a report based on CSI measurement using the first and second sets of CSI-RS ports across the plurality of resource configurations. In certain aspects, the processor 2304 has circuitry configured to implement the code stored in the computer-readable medium/memory 2312. The processor 2304 includes circuitry 2320 for transmitting, to a UE, information regarding a configuration of at least one CSI-RS resource, wherein the configuration of each CSI-RS resource comprises one or more resource mapping configurations; circuitry 2322 for transmitting CSI-RS, in accordance with the information, on resources for a first set of CSI-RS ports or CDM groups within the CSI-RS resource based at least in part on a first resource mapping, and on resources for a second set of CSI-RS ports or CDM groups within the resource based at least in part on a second resource mapping; and circuitry 2324 for receiving, from the UE, a report based on CSI measurement using the first and second sets of CSI-RS ports across the plurality of resource configurations.

EXAMPLE ASPECTS

Aspect 1: A method for wireless communications by a user equipment (UE), comprising receiving information regarding a configuration of at least one channel state information (CSI) reference signal (RS) resource, wherein the configuration of each CSI-RS resource comprises one or more resource mapping configurations, determining, from the information, resources for a first set of CSI-RS ports or code division multiplexing (CDM) groups within the CSI-RS resource based at least in part on a first resource mapping, and resources for a second set of CSI-RS ports or CDM groups within the resource based at least in part on a second resource mapping, and performing CSI measurement using the first and second sets of CSI-RS ports across the plurality of resource configurations.

Aspect 2: The method of Aspect 1, wherein the information comprises at least the first and second resource mapping configurations.

Aspect 3: The method of Aspect 1 or 2, wherein each of the first and second resource mapping configuration indicates parameters including at least one of: a CDM type, number of ports, resource element (RE) positions within a resource block (RB), symbol position within a slot, and CSI-RS port density configuration, and the first and second resource mapping configurations indicate different values for at least one of the parameters.

Aspect 4: The method of Aspect 3, wherein the CSI port density configuration comprises a port density and an RB position when the density is smaller than 1.

Aspect 5: The method of Aspect 3 or 4, wherein the first and second resource mapping configurations indicate a same value for at least one of the CDM type or number of ports.

Aspect 6: The method of any of Aspects 3-5, wherein the first and second resource mapping configurations indicate different values for RE positions and a same value for symbol position and a same value for the CSI-RS port density configuration.

Aspect 7: The method of any of Aspects 3-6, wherein the first and second resource mapping configurations indicate a same value for RE position and different values for symbol position and a same value for the CSI-Rs port density configuration.

Aspect 8: The method of any of Aspects 3-7, wherein the first and second resource mapping configurations indicate same values for RE position, symbol position, and CSI-RS port density, but different CSI-RS port density configurations.

Aspect 9: The method of any of Aspects 3-8, wherein the first and second resource mapping configurations indicate different values for RE positions and symbol positions in different RBs.

Aspect 10: The method of any of Aspects 3-9, wherein the first and second resource mapping configurations indicate different numbers of CDM groups on different symbols.

Aspect 11: The method of any of Aspects 1-10, wherein the information comprises a first resource mapping configuration and additional information, and a second resource mapping for the second set of CSI-RS ports or the second set of CDM groups is determined based on the additional information and one or more parameters indicated in the first resource mapping configuration.

Aspect 12: The method of Aspect 11, wherein the first set of CSI-RS ports or CDM groups is determined based at least in part on the first resource mapping configuration of the information.

Aspect 13: The method of Aspect 11 or 12, wherein the additional information comprises resource element (RE) positions within a resource block (RB) for the second set of CSI-RS ports or the second set of CDM groups.

Aspect 14: The method of any of Aspects 11-13, wherein the additional information comprises symbol positions within a slot for the second set of CSI-RS ports or the second set of CDM groups.

Aspect 15: The method of any of Aspects 11-14, wherein the additional information comprises a CSI-RS port density configuration for the second set of CSI-RS ports or ports within the second set of CDM groups.

Aspect 16: The method of any of Aspects 11-15, wherein the additional information comprises a number of additional resource mappings, and the UE determines a density and resource block (RB) comb for the second set of CSI-RS ports or the second set of CDM groups based on the number of additional resource mappings and a density and RB comb indicated in the first resource mapping configuration.

Aspect 17: The method of any of Aspects 1-16, wherein the UE performs resource mapping based on CSI-RS port indexing starting from ports within each CDM group within each resource mapping, then across CDM groups in the same resource mapping configuration, then across different resource mapping configurations.

Aspect 18: The method of any of Aspects 1-17, wherein the information comprises a resource mapping configuration with sufficient information to determining the resources for the first set of CSI-RS ports or CDM groups and the resources for the second set of CSI-RS ports.

Aspect 19: The method of Aspect 18, wherein the resource mapping configuration comprises an indication for a first set of resource element (RE) locations for a first set of CDM groups or a first set of ports and an indication for a second set of RE locations for a second set of CDM groups or a second set of ports.

Aspect 20: The method of Aspect 18 or 19, wherein the resource mapping configuration comprises an indication for a first set of symbol locations for a first set of CDM groups or a first set of ports and an indication for a second set of symbol locations for a second set of CDM groups or a second set of ports.

Aspect 21: The method of Aspect 20, wherein each symbol location indication comprises at least one of a first starting orthogonal frequency division multiplexed (OFDM) symbol or a second starting OFDM symbol.

Aspect 22: The method of any of Aspects 18-21, wherein the resource mapping configuration comprises an indication for a density and resource block (RB) comb for a first set of CDM groups or a first set of ports and an indication for a density and RB comb for a second set of CDM groups or a second set of ports.

Aspect 23: The method of any of Aspects 18-22, wherein the resource mapping configuration indicates a number of ports, the method further comprising determining a total number of resource elements (REs) based on a RE location and a symbol location indicated in the resource mapping configuration, determining a number of sets of CDM groups or a number of sets of ports based on a total number of ports and the total number of REs, and determining first density and RB comb for a first set of CDM groups or a first set of ports and second density and RB comb for a second set of CDM groups or a second set of ports based on the total number of ports and the total number of REs.

Aspect 24: The method of any of Aspects 18-23, wherein, if the resource mapping configuration indicates a single RE location indication, all CDM group sets or port sets share the same RE location.

Aspect 25: The method of any of Aspects 18-24 wherein, if the resource mapping configuration indicates a single symbol location, all CDM group sets or port sets share the same symbol location.

Aspect 26: The method of any of Aspects 18-25 wherein, if the resource mapping configuration indicates a single density and resource block (RB) comb configuration, all CDM group sets or port sets share the same density and RB comb.

Aspect 27: The method of any of Aspects 18-26, wherein the resource mapping configuration indicates different numbers of CDM groups or port sets for the first and second sets.

Aspect 28: The method of any of Aspects 1-27, wherein the CSI-RS ports comprise at least 48 CSI-RS ports.

Aspect 29: The method of Aspect 28, wherein the CSI-RS ports occupy 12 resource elements (REs) and 4 symbols, and the method further comprising for a first CDM configuration, receiving an indication of 6 RE locations and 2 symbol locations, for a second CDM configuration, receiving an indication of 6 RE locations and 2 symbol locations, or for a third CDM configuration, receiving an indication of 6 RE locations and 1 symbol location.

Aspect 30: The method of Aspect 28 or 29, wherein the CSI-RS ports occupy 8 resource elements (REs) and 6 symbols, and the method further comprising for a first CDM configuration, receiving an indication of 4 RE locations and 3 symbol locations, or for a second CDM configuration, receiving an indication of 4 RE locations and 3 symbol locations.

Aspect 31: The method of any of Aspects 28-30, wherein the CSI-RS ports occupy 6 resource elements (REs) and 8 symbols, and the method further comprises for a first CDM configuration, receiving an indication of 3 RE locations and 2 or 4 symbol locations, for a second CDM configuration, receiving an indication of 3 RE locations and 2 or 4 symbol locations, and for a third CDM configuration, receiving an indication of 3 RE locations and 2 symbol locations.

Aspect 32: The method of any of Aspects 1=33, wherein the CSI-RS ports comprise at least 64 CSI-RS ports.

Aspect 33: The method of Aspect 32, wherein the CSI-RS ports occupy 8 resource elements (REs) and 8 symbols, and the method further comprising for a first CDM configuration, receiving an indication of 4 RE locations and 2 or 4 symbol locations, for a second CDM configuration, receiving an indication of 4 RE locations and 2 or 4 symbol locations, or for a third CDM configuration, receiving indication of 4 RE locations and 2 symbol location.

Aspect 34: A method for wireless communications by a user equipment (UE), comprising transmitting, to a user equipment (UE), information regarding a configuration of at least one channel state information (CSI) reference signal (RS) resource, wherein the configuration of each CSI-RS resource comprises one or more resource mapping configurations, transmitting CSI-RS, in accordance with the information, on resources for a first set of CSI-RS ports or code division multiplexing (CDM) groups within the CSI-RS resource based at least in part on a first resource mapping, and on resources for a second set of CSI-RS ports or CDM groups within the resource based at least in part on a second resource mapping, and receiving, from the UE, a report based on CSI measurement using the first and second sets of CSI-RS ports across the plurality of resource configurations.

Aspect 35: The method of Aspect 34, wherein the information comprises at least the first and second resource mapping configurations.

Aspect 36: The method of Aspect 34 or 35, wherein each of the first and second resource mapping configuration indicates parameters including at least one of: a CDM type, number of ports, resource element (RE) positions within a resource block (RB), symbol position within a slot, and CSI-RS port density configuration, and the first and second resource mapping configurations indicate different values for at least one of the parameters.

Aspect 37: The method of Aspect 36, wherein the CSI port density configuration comprises a port density and an RB position when the density is smaller than 1.

Aspect 38: The method of Aspect 36 or 37, wherein the first and second resource mapping configurations indicate a same value for at least one of the CDM type or number of ports.

Aspect 39: The method of any of Aspects 36-38, wherein the first and second resource mapping configurations indicate different values for RE positions and a same value for symbol position and a same value for the CSI-RS port density configuration.

Aspect 40: The method of any of Aspects 36-39, wherein the first and second resource mapping configurations indicate a same value for RE position and different values for symbol position and a same value for the CSI-Rs port density configuration.

Aspect 41: The method of any of Aspects 36-40, wherein the first and second resource mapping configurations indicate same values for RE position, symbol position, and CSI-RS port density, but different CSI-RS port density configurations.

Aspect 42: The method of any of Aspects 36-41, wherein the first and second resource mapping configurations indicate different values for RE positions and symbol positions in different RBs.

Aspect 43: The method of any of Aspects 36-42, wherein the first and second resource mapping configurations indicate different numbers of CDM groups on different symbols.

Aspect 44: The method of any of Aspects 34-43, wherein the information comprises a first resource mapping configuration and additional information, and a second resource mapping for the second set of CSI-RS ports or the second set of CDM groups is determined based on the additional information and one or more parameters indicated in the first resource mapping configuration.

Aspect 45: The method of Aspect 44, wherein the first set of CSI-RS ports or CDM groups is determined based at least in part on the first resource mapping configuration of the information.

Aspect 46: The method of Aspect 44 or 45, wherein the additional information comprises resource element (RE) positions within a resource block (RB) for the second set of CSI-RS ports or the second set of CDM groups.

Aspect 47: The method of any of Aspects 44-46, wherein the additional information comprises symbol positions within a slot for the second set of CSI-RS ports or the second set of CDM groups.

Aspect 48: The method of any of Aspects 44-47, wherein the additional information comprises a CSI-RS port density configuration for the second set of CSI-RS ports or ports within the second set of CDM groups.

Aspect 49: The method of any of Aspects 44-48, wherein the additional information comprises a number of additional resource mappings, and the configuration information indicates a density and resource block (RB) comb for the second set of CSI-RS ports or the second set of CDM groups based on the number of additional resource mappings and a density and RB comb indicated in the first resource mapping configuration.

Aspect 50: The method of any of Aspects 34-49, further comprising configuring the UE to perform resource mapping based on CSI-RS port indexing starting from ports within each CDM group within each resource mapping, then across CDM groups in the same resource mapping configuration, then across different resource mapping configurations.

Aspect 51: The method of any of Aspects 34-50, wherein the information comprises a resource mapping configuration with sufficient information to determining the resources for the first set of CSI-RS ports or CDM groups and the resources for the second set of CSI-RS ports.

Aspect 52: The method of Aspect 51, wherein the resource mapping configuration comprises an indication for a first set of resource element (RE) locations for a first set of CDM groups or a first set of ports and an indication for a second set of RE locations for a second set of CDM groups or a second set of ports.

Aspect 53: The method of Aspect 51 or 52, wherein the resource mapping configuration comprises an indication for a first set of symbol locations for a first set of CDM groups or a first set of ports and an indication for a second set of symbol locations for a second set of CDM groups or a second set of ports.

Aspect 54: The method of Aspect 53, wherein each symbol location indication comprises at least one of a first starting orthogonal frequency division multiplexed (OFDM) symbol or a second starting OFDM symbol.

Aspect 55: The method of any of Aspects 51-54, wherein the resource mapping configuration comprises an indication for a density and resource block (RB) comb for a first set of CDM groups or a first set of ports and an indication for a density and RB comb for a second set of CDM groups or a second set of ports.

Aspect 56: The method of any of Aspects 51-55, wherein the resource mapping configuration indicates a number of ports, a total number of resource elements (Res) based on the RE location, and symbol location, a number of sets of CDM groups or a number of sets of ports based on the total number of ports and the total number of REs, and a first density and RB comb for a first set of CDM groups or a first set of ports and a second density and RB comb for a second set of CDM groups or a second set of ports based on the total number of ports and the total number of REs.

Aspect 57: The method of any of Aspects 51-56 wherein, if the resource mapping configuration indicates a single RE location indication, all CDM group sets or port sets share the same RE location.

Aspect 58: The method of any of Aspects 51-57 wherein, if the resource mapping configuration indicates a single symbol location, all CDM group sets or port sets share the same symbol location.

Aspect 59: The method of any of Aspects 51-58 wherein, if the resource mapping configuration indicates a single density and resource block (RB) comb configuration, all CDM group sets or port sets share the same density and RB comb.

Aspect 60: The method of any of Aspects 51-59, wherein the resource mapping configuration indicates different numbers of CDM groups or port sets for the first and second sets.

Aspect 61: The method of any of Aspects 34-60, wherein the CSI-RS ports comprise at least 48 CSI-RS ports.

Aspect 62: The method of Aspect 61, wherein the CSI-RS ports occupy 12 resource elements (REs) and 4 symbols, and the method further comprising, for a first CDM configuration, transmitting an indication of 6 RE locations and 2 symbol locations, for a second CDM configuration, transmitting an indication of 6 RE locations and 2 symbol locations, or for a third CDM configuration, transmitting an indication of 6 RE locations and 1 symbol location.

Aspect 63: The method of Aspect 61 or 62, wherein the CSI-RS ports occupy 8 resource elements (REs) and 6 symbols, and the method further comprising for a first CDM configuration, transmitting an indication of 4 RE locations and 3 symbol locations, or for a second CDM configuration, transmitting an indication of 4 RE locations and 3 symbol locations.

Aspect 64: The method of any of Aspects 61-63, wherein the CSI-RS ports occupy 6 resource elements (REs) and 8 symbols, and the method further comprises for a first CDM configuration, transmitting an indication of 3 RE locations and 2 or 4 symbol locations, for a second CDM configuration, transmitting an indication of 3 RE locations and 2 or 4 symbol locations, and for a third CDM configuration, transmitting an indication of 3 RE locations and 2 symbol locations.

Aspect 65: The method of any of Aspects 34-64, wherein the CSI-RS ports comprise at least 64 CSI-RS ports.

Aspect 66: The method of Aspect 65, wherein the CSI-RS ports occupy 8 resource elements (REs) and 8 symbols, and the method further comprising for a first CDM configuration, transmitting an indication of 4 RE locations and 2 or 4 symbol locations, for a second CDM configuration, transmitting an indication of 4 RE locations and 2 or 4 symbol locations, or for a third CDM configuration, transmitting indication of 4 RE locations and 2 symbol location.

Aspect 67: A wireless device comprising a memory, and a processor coupled to the memory, the processor and memory configured to perform operations of the method of one or more of Aspects 1-66.

Aspect 68: A wireless device comprising various means to perform operations of the method of one or more of Aspects 1-66.

Aspect 69: A non-transitory computer-readable medium that comprises instructions that when executed by a wireless device, cause the wireless device to perform operations of the method of one or more of Aspects 1-66.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, the various processor shown in FIG. 3 may be configured to perform operations and/or techniques described herein with respect to one or more of FIGS. 10-20).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations and/or techniques described herein and illustrated in FIGS. 10-21).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
  receiving information regarding a configuration of at least one channel state information (CSI) reference signal (RS) resource, wherein the configuration of each CSI-RS resource comprises one or more resource mapping configurations;

determining, from the information, resources for a first set of CSI-RS ports or code division multiplexing (CDM) groups within the CSI-RS resource based at least in part on a first resource mapping, and resources for a second set of CSI-RS ports or CDM groups within the CSI-RS resource based at least in part on the first resource mapping and a second resource mapping, wherein the first set of CSI-RS ports is different from the second set of CSI-RS ports; and performing CSI measurement using the first and second sets of CSI-RS ports.

2. The method of claim 1, wherein the information comprises at least first and second resource mapping configurations that correspond to different resource mappings.

3. The method of claim 2, wherein:

each of the first and second resource mapping configuration indicates parameters including at least one of: a CDM type, number of ports, resource element (RE) positions within a resource block (RB), symbol position within a slot, and CSI-RS port density configuration; and the first and second resource mapping configurations indicate different values for at least one of the parameters.

4. The method of claim 3, wherein the CSI port density configuration comprises a port density and an RB position when the density is smaller than 1.

5. The method of claim 3, wherein:

the first and second resource mapping configurations indicate same values for RE position and symbol position, but different CSI-RS port density configurations.

6. The method of claim 1, wherein:

the information comprises a first resource mapping configuration and additional information; and the second resource mapping for the second set of CSI-RS ports or the second set of CDM groups is determined based on the additional information and one or more parameters indicated in the first resource mapping configuration.

7. The method of claim 6, wherein the first set of CSI-RS ports or CDM groups is determined based at least in part on the first resource mapping configuration of the information.

8. The method of claim 6, wherein:

the additional information comprises a number of additional resource mappings; and determining a density and resource block (RB) comb for the second set of CSI-RS ports or the second set of CDM groups based on the number of additional resource mappings and a density and RB comb indicated in the first resource mapping configuration.

9. The method of claim 1, further comprising:

performing resource mapping based on CSI-RS port indexing starting from ports within each CDM group within each resource mapping, then across CDM groups in same resource mapping configuration, then across different resource mapping configurations.

10. The method of claim 1, wherein:

the information comprises a resource mapping configuration with sufficient information to determine the resources for the first set of CSI-RS ports or CDM groups and the resources for the second set of CSI-RS ports.

11. The method of claim 1, wherein the CSI-RS ports comprise at least 48 CSI-RS ports and occupy 12 resource elements (REs) and 4 symbols; and the method further comprising:

for a first CDM configuration, receiving an indication of 6 RE locations and 2 symbol locations;

for a second CDM configuration, receiving an indication of 6 RE locations and 2 symbol locations; or for a third CDM configuration, receiving an indication of 6 RE locations and 1 symbol location.

12. The method of claim 1, wherein the CSI-RS ports comprise at least 48 CSI-RS ports and occupy 8 resource elements (REs) and 6 symbols; and the method further comprising:

for a first CDM configuration, receiving an indication of 4 RE locations and 3 symbol locations; or for a second CDM configuration, receiving an indication of 4 RE locations and 3 symbol locations.

13. The method of claim 1, wherein the CSI-RS ports comprise at least 48 CSI-RS ports and occupy 6 resource elements (REs) and 8 symbols; and the method further comprises:

for a first CDM configuration, receiving an indication of 3 RE locations and 2 or 4 symbol locations;

for a second CDM configuration, receiving an indication of 3 RE locations and 2 or 4 symbol locations; and for a third CDM configuration, receiving an indication of 3 RE locations and 2 symbol locations.

14. The method of claim 1, wherein the CSI-RS ports comprise at least 64 CSI-RS ports and occupy 8 resource elements (REs) and 8 symbols; and the method further comprising:

for a first CDM configuration, receiving an indication of 4 RE locations and 2 or 4 symbol locations;

for a second CDM configuration, receiving an indication of 4 RE locations and 2 or 4 symbol locations; or for a third CDM configuration, receiving indication of 4 RE locations and 2 symbol location.

15. A method for wireless communications by a network entity, comprising:

transmitting, to a user equipment (UE), information regarding a configuration of at least one channel state information (CSI) reference signal (RS) resource, wherein the configuration of each CSI-RS resource comprises one or more resource mapping configurations;

transmitting CSI-RS, in accordance with the information, on resources for a first set of CSI-RS ports or code division multiplexing (CDM) groups within the CSI-RS resource based at least in part on a first resource mapping, and on resources for a second set of CSI-RS ports or CDM groups within the resource based at least in part on the first resource mapping and a second resource mapping, wherein the first set of CSI-RS ports is different from the second set of CSI-RS ports; and receiving, from the UE, a report based on CSI measurement using the first and second sets of CSI-RS ports.

16. The method of claim 15, wherein the information comprises at least first and second resource mapping configurations that correspond to different resource mappings.

17. The method of claim 16, wherein:

each of the first and second resource mapping configuration indicates parameters including at least one of: a CDM type, number of ports, resource element (RE)

positions within a resource block (RB), symbol position within a slot, and CSI-RS port density configuration; and the first and second resource mapping configurations indicate different values for at least one of the parameters.

18. The method of claim 17, wherein the CSI port density configuration comprises a port density and an RB position when the density is smaller than 1.

19. The method of claim 17, wherein:

the first and second resource mapping configurations indicate same values for RE position and symbol position, but different CSI-RS port density configurations.

20. The method of claim 15, wherein:

the information comprises a first resource mapping configuration and additional information; and a second resource mapping for the second set of CSI-RS ports or the second set of CDM groups is determined based on the additional information and one or more parameters indicated in the first resource mapping configuration.

21. The method of claim 20, wherein the first set of CSI-RS ports or CDM groups is determined based at least in part on the first resource mapping configuration of the information.

22. The method of claim 20, wherein:

the additional information comprises a number of additional resource mappings; and the configuration information indicates a density and resource block (RB) comb for the second set of CSI-RS ports or the second set of CDM groups based on the number of additional resource mappings and a density and RB comb indicated in the first resource mapping configuration.

23. The method of claim 15, further comprising configuring the UE to perform resource mapping based on CSI-RS port indexing starting from ports within each CDM group within each resource mapping, then across CDM groups in same resource mapping configuration, then across different resource mapping configurations.

24. The method of claim 15, wherein:

the information comprises a resource mapping configuration with sufficient information to determine the resources for the first set of CSI-RS ports or CDM groups and the resources for the second set of CSI-RS ports.

25. The method of claim 15, wherein the CSI-RS ports comprise at least 48 CSI-RS ports and occupy 12 resource elements (REs) and 4 symbols; and the method further comprising:

for a first CDM configuration, transmitting an indication of 6 RE locations and 2 symbol locations;

for a second CDM configuration, transmitting an indication of 6 RE locations and 2 symbol locations; or for a third CDM configuration, transmitting an indication of 6 RE locations and 1 symbol location.

26. The method of claim 15, wherein the CSI-RS ports comprise at least 48 CSI-RS ports and occupy 8 resource elements (REs) and 6 symbols; and the method further comprising:

for a first CDM configuration, transmitting an indication of 4 RE locations and 3 symbol locations; or for a second CDM configuration, transmitting an indication of 4 RE locations and 3 symbol locations.

27. The method of claim 15, wherein the CSI-RS ports comprise at least 48 CSI-RS ports and occupy 6 resource elements (REs) and 8 symbols; and the method further comprises:

for a first CDM configuration, transmitting an indication of 3 RE locations and 2 or 4 symbol locations;

for a second CDM configuration, transmitting an indication of 3 RE locations and 2 or 4 symbol locations; and for a third CDM configuration, transmitting an indication of 3 RE locations and 2 symbol locations.

28. The method of claim 15, wherein the CSI-RS ports comprise at least 64 CSI-RS ports and occupy 8 resource elements (REs) and 8 symbols; and the method further comprising:

for a first CDM configuration, transmitting an indication of 4 RE locations and 2 or 4 symbol locations;

for a second CDM configuration, transmitting an indication of 4 RE locations and 2 or 4 symbol locations; or for a third CDM configuration, transmitting indication of 4 RE locations and 2 symbol location.

29. An apparatus for wireless communications by at a user equipment (UE), comprising:

a memory comprising instructions; and one or more processors, individually or collectively, configured to execute the instructions to cause the UE to:

receive information regarding a configuration of at least one channel state information (CSI) reference signal (RS) resource, wherein the configuration of each CSI-RS resource comprises one or more resource mapping configurations;

determine, from the information, resources for a first set of CSI-RS ports or code division multiplexing (CDM) groups within the CSI-RS resource based at least in part on a first resource mapping, and resources for a second set of CSI-RS ports or CDM groups within the resource based at least in part on the first resource mapping and a second resource mapping, wherein the first set of CSI-RS ports is different from the second set of CSI-RS ports; and perform CSI measurement using the first and second sets of CSI-RS ports.

30. An apparatus for wireless communications by at a network entity, comprising:

a memory comprising instructions; and one or more processors, individually or collectively, configured to execute the instructions to cause the network entity to:

transmit, to a user equipment (UE), information regarding a configuration of at least one channel state information (CSI) reference signal (RS) resource, wherein the configuration of each CSI-RS resource comprises one or more resource mapping configurations;

transmit CSI-RS, in accordance with the information, on resources for a first set of CSI-RS ports or code division multiplexing (CDM) groups within the CSI-RS resource based at least in part on a first resource mapping, and on resources for a second set of CSI-RS ports or CDM groups within the resource based at least in part on the first resource mapping and a second resource mapping, wherein the first set of CSI-RS ports is different from the second set of CSI-RS ports; and receive, from the UE, a report based on CSI measurement using the first and second sets of CSI-RS ports.

* * * * *